United States Patent [19]

Howard

[11] 4,313,616
[45] Feb. 2, 1982

[54] SPEED RESPONSIVE TRAILER STABILIZER WITH ZERO SLACK

[76] Inventor: Durrell U. Howard, 306 Krameria Dr., San Antonio, Tex. 78217

[21] Appl. No.: 40,268

[22] Filed: May 18, 1979

[51] Int. Cl.³ .................. B60D 1/00; B60T 7/20; B62D 53/00
[52] U.S. Cl. .................. 280/446 B; 188/3 R; 188/112 A; 280/432
[58] Field of Search ........... 188/3 R, 112 A, 112 R; 280/446 R, 446 B, 432, 456 R, 474

[56] References Cited

U.S. PATENT DOCUMENTS

| | | | |
|---|---|---|---|
| 3,288,240 | 11/1966 | Franzel | 188/112 |
| 3,379,456 | 4/1968 | Bogie | 280/432 |
| 3,398,991 | 8/1968 | Compton | 303/7 |
| 3,697,099 | 10/1972 | Potts et al. | 280/446 B |
| 3,758,165 | 9/1973 | Savelli | 303/20 |
| 3,810,521 | 5/1974 | Sparr | 280/446 B |
| 3,825,281 | 7/1974 | Howard | 280/423 R |
| 3,861,717 | 1/1975 | Knox | 280/446 B |
| 3,894,773 | 7/1975 | Cleveland et al. | 280/446 B |
| 3,948,544 | 4/1976 | Presley et al. | 280/446 B |
| 3,981,542 | 9/1976 | Abrams et al. | 188/3 R |
| 3,994,510 | 11/1976 | Howard | 280/432 |
| 4,040,507 | 8/1977 | Reise | 188/112 |
| 4,082,309 | 4/1978 | Fox | 280/432 |
| 4,133,552 | 1/1979 | Sheine | 280/446 B |

*Primary Examiner*—Joseph F. Peters, Jr.
*Assistant Examiner*—Donn McGiehan
*Attorney, Agent, or Firm*—Pollock, Vande Sande & Priddy

[57] ABSTRACT

A trailer stabilizer is comprised of a hydraulic assembly having a pair of hydraulic units for providing viscous fluid resistance to relative turning movements between a trailer and a towing vehicle. The assembly includes flow controls for varying turning resistance in response to turning rate and vehicle speed. Slack removal members constantly bias interconnected couplings to provide rate sensing and turning resistance with zero mechanical slack. A brake control system actuates towed vehicle brakes in response to hydraulic system pressure and includes speed responsive components preventing brake application below a predetermined speed. Circuitry is also provided for varying braking force in response to vehicle speed and turning rate, for adjusting braking force according to trailer size and road conditions, and for testing braking force adjustments.

81 Claims, 16 Drawing Figures

SPEED RESPONSIVE TRAILER STABILIZER WITH ZERO SLACK

TECHNICAL FIELD OF INVENTION

This invention relates to towing assemblies for coupling a towable vehicle to a towing vehicle, and more particularly to a novel mechanism for stabilizing a towed vehicle coupled to a towing vehicle by a conventional towing connection. The invention is especially useful for towing trailers of the center-axle type with automobiles.

BACKGROUND ART

Conventional towing connections usually provide three types or "degrees" of rotational movement between the towing and towed vehicles, i.e., pitch, roll and yaw.

Conventional center-axle trailers are designed with the main load supporting wheels located approximately beneath the center of mass of the loaded vehicle. The towing connection for center-axle trailers is usually connected at one end to the forward frame of the trailer and detachably connected at the other end to the towing vehicle by a conventional ball joint type hitch, thereby providing the three degrees of rotational movement referred to above.

When trailers of the center-axle type are towed behind a car or truck, there is a tendency for the trailer to sway when traveling at highway speeds. Sway is due primarily to the location of the effective pivot point for relative movement between the two vehicles about the yaw axis. With a conventional hitch, this pivot point is at the ball joint which is often located a substantial distance behind the rear wheels of the towing vehicle. As a result, a large moment arm exists between the pivotal trailer connection and the center of gravity of the towing vehicle. Consequently, a significant force or torque is applied to the towing vehicle by the trailer when the vehicles are rounding a curve and this tends to displace or sway the towing vehicle laterally to one side. Similar upset forces may be generated by relative movement about the yaw axis during forward surge of the trailer while the vehicles are traveling down a steep grade or braking. Control over both vehicles may thus be reduced and in some cases lost.

Center-axle trailers are usually manageable as long as the ratio of trailer to tow vehicle weight is favorable and the speed of the combination is relatively low. When the trailer to tow vehicle weight ratio becomes equal, or the trailer becomes heavier than the tow vehicle, the dynamic forces of the trailer begin to override the inherent stability of the tow vehicle. Furthermore, as the speed of this combination increases, only small changes in the steering angle of the towing vehicle or in the angle between towing and towed vehicles are required to produce large upset forces. Above a certain speed or crossover point, dynamic oscillations in an unstable phase relationship can cause such forces to build up rapidly to a level that cannot be controlled. Dynamic instability may be initiated by air buffeting from gusty crosswinds or large vehicles passing at high speeds, uneven roadbeds or other abrupt changes in the road surface, rapid lane changes and other sudden turns by the towing vehicle, or a flat tire or blowout.

The instability of this vehicle combination is often aggravated by improper loading of the trailer and/or of the hitch connection at the rear of the tow vehicle, which can bring on uncontrollable oscillations at an unsuspectingly low speed. The effects of improper hitch loads on vehicle stability and the problems with using devices of the load leveling type to redistribute such loads have been the subject of a study for the U.S. Department of Transportation entitled "Effects of Weight Distributing Hitch Torque on Car-Trailer Directional Control and Braking", Report No. DOT HS 803248, Oct. 1977, available under Catalog No. PB 278297 from the National Technical Information Service, Springfield, Va. 22151.

There have been many unsuccessful attempts in the prior art to improve the stability of the conventional hitch arrangement for towing center-axle trailers. Prior art devices generally have involved, as one solution, the use of frictional or hydraulic components to resist turning of the trailer relative to the tow vehicle. A frictional device of this type is shown in Knox U.S. Pat. No. 3,861,717 and a hydraulic device in Howley U.S. Pat. No. 2,202,658. A second approach involves the automatic application of brakes on the trailer wheels to oppose trailer sway. Examples of such devices are found in Sparr U.S. Pat. No. 3,810,521 and Reise U.S. Pat. No. 4,040,507.

Such prior art devices rely only on one approach and provide only limited control of trailer sway. They also have a number of disadvantages. Resistance devices have a geometry that is not capable of opposing small changes in angle between the longitudinal axes of the vehicles with a significant stabilizing force. Effective resistance to small angular deflections requires that the stabilizer connections on the towing vehicle be as near as practicable to the two main longitudinal beams of the vehicle frame. Those beams are usually 1 to 2 feet out from the trailer hitch pivot point. If prior art devices were to be attached at the proper location, the distances that connecting linkages would have to travel for slow speed turning maneuvers would be too great for the device to accommodate. In addition, such devices often generate an undesirable resistance to the reverse angular movement required for the vehicles to return to their neutral, aligned positions. Another problem with prior art devices is that the linkages and couplings connecting them to the vehicles have a relatively large amount of mechanical slack that must be absorbed before the stabilizing components can respond to relative movement between the vehicles.

Anti-sway braking devices make no contribution to straight-ahead, no-sway stability. Such devices operate only when the trailer has already swayed by an excessive amount. If the device is sensitive enough to respond to the relatively small sway angles that occur at high speeds, it is too sensitive for low speed maneuvers. Thus, the high sensitivity required at highway speeds results in frequent brake application when not needed at low speeds. This interferes with driver control and results in excessive brake and tire wear, high fuel consumption, and loss of pulling and passing power.

DISCLOSURE OF THE INVENTION

Prior art devices known to the inventor are not able to provide the needed anti-sway control and often permit dynamic oscillations of the trailer and tow vehicle to become synchronized in an adverse phase relationship. If this happens at highway speeds, the forces of instability may multiply so rapidly that they cannot be controlled either by the device itself or the driver of the tow vehicle. In fact, the efforts of even the most experienced driver under these conditions can actually aggrevate the situation by contributing to the magnitude of the adverse phase relationship.

During slow and medium speed maneuvers of the trailer and tow vehicle combination, the upset forces generated by oscillation of the trailer are usually small enough to be controlled by driver manipulation of the tow vehicle. However, as speed increases, this situation changes dramatically. Although the dividing line between what will be referred to as "high speed" and "low speed" characteristics is somewhat broad, the inventor has found that there are substantial differences in the stabilizing forces needed to control trailer sway above and below a crossover point which occurs at a towing speed in the range of 35 to 45 miles per hour. Above this speed range, a stabilizing system should be capable of providing a stabilizing moment about the yaw axis at the trailer hitch of about 5 to 10 inch-pounds per pound of trailer weight. Below this speed range, a stabilizing moment of 2 to 4 inch-pounds per pound of trailer weight should be sufficient for stability. Thus, a speed in the range of between 35 and 45 miles per hour was determined to be the proper point to switch over from a low speed to a high speed stabilizing effect. However, other switch-over points may be used depending upon the specific characteristics of the towing and towed vehicles and the prevailing climatic and roadway conditions.

Destabilizing forces increase with speed for two reasons. First, the magnitude of the inertial and upset forces resulting from a swaying trailer increase rapidly with speed. Secondly, a small change in the angle about the yaw axis between the longitudinal axis of the trailer and the longitudinal axis of the tow vehicle produces a much greater rate of lateral movement at high speeds than at low speeds. There is therefore a great difference in magnitude of the angle changes that occur above and below the crossover speed range. Below this range, the angle change for slow speed maneuvers, such as turning a corner, can reach 70 degrees or more depending on the geometry of the towing connection and of the vehicles. At about 40 to 45 miles per hour, the minimum safe turning radius establishes a maximum angle change of only 1 to 2 degrees between the longitudinal axes of the vehicles. As speed further increases, the maximum permissible angle change is even less. Thus, while the driver is making what appears to be a rapid change in vehicle direction, the size of the turning angle is not only less at high speed, but also is achieved at a slower rate. The high speed sway control problem is, therefore, totally different from that which one might anticipate from trailer maneuvers and oscillations at low speeds. Displacement of stabilizer linkages is greatly reduced and much higher inertial forces must be controlled.

Precise sway control is needed to deal effectively with the minute sway and angle changes occurring at highway speeds. Such control can be achieved by "zero slack" stabilizer connections. As used in this specification, "zero slack" means that substantially all mechanical slack is biased or preloaded out of the couplings and linkages between the stabilizing components and the towing and towed vehicles. In actual road tests, it was discovered that a solid hookup which appeared to allow no angle change between car and trailer did not prevent the driver from steering the combination around fairly sharp turns in the roadway. Although not practicable for low speed maneuvers, this arrangement proved to be very stable in straight-line, high-speed travel. Surprisingly, however, an intentional driver-induced sway at high speeds could still produce very undesirable oscillations which required better than average driver skill to regain control of the vehicles. It was thereby determined that an effective stabilizer should always allow at least some small amount of angular movement between the vehicles and provide a high level of dampening for any such movement at speeds above the 35 to 45 mile per hour range.

It was further discovered that viscous dampening was a very effective way of providing proper stabilization in each speed range and that the level of dampening could be varied by using relative motion between the vehicles to pump the viscous fluid at different rates of flow. In order to provide the sensitive sway control needed at high speed, a relatively large volume of fluid should be pumped for each degree of angle change about the yaw axis. The hydraulic pressure pattern for a given flow restriction then establishes the rate of angle change or angular velocity permitted between the vehicles. Having established the flow requirements for high speed control, the total volume of fluid to be pumped within the system is determined by the total angle change occurring during low speed maneuvers.

The investigations referred to above also demonstrated that it was not practicable to achieve the desired degree of high speed stability by trailer braking action alone. Towed vehicle braking was determined to be useful only in more extreme or emergency situations as an adjunct to stabilizers of the turning resistance type. Furthermore, the hydraulic pressure pattern of the present invention was found to provide a positive and extremely accurate method of sensing a potentially out-of-control situation and selectively activating trailer brakes in response thereto.

One of the objects of the present invention is to provide a product within the cost and convenience parameters of the average trailer user that resolves the stability problems encountered in towing center-axle trailers at both low and high speeds. It is believed that the system disclosed is capable of greater stability, control and reliability than any prior art stabilizer now available and can be made at lower cost. The invention is easy to hook up, requiring a minimum of hand tools, and will not interfere with other devices, such as load levelers, mounted between the towing vehicle and trailer. The hardware is of sturdy and durable construction, relatively simple and inexpensive to manufacture and assemble, easily maintained, and can be installed on either new or existing vehicles.

Other objects of the invention include the provision of a viscous resistance to relative turning movement between a towed vehicle and a towing vehicle which is variable in accordance with the angular velocity of such movement. The viscous resistance rapidly dampens towed vehicle sway about the yaw axis and can be arranged to also dampen pitch and roll movements of the towed vehicle relative to the towing vehicle. A high level of sensitivity and stiffness for resisting relative movement at the very inception of a sway condition is provided by removal of mechanical slack from all coupling connections between the two vehicles. The viscous resistance to relative movements is selectively varied in response to the forward speed of the coupled vehicles. In a high speed mode, the tow vehicle and trailer are so stiffly interconnected that the two vehicles act as a single combination unit with inherent stability resisting both internal and external upset forces tending to cause trailer sway. High speed stability is such as to resist strongly any tendency of the trailer to jackknife when the tow vehicle brakes are applied or during a downhill travel. Control to prevent both sway and jackknifing is further enhanced by independent application of trailer brakes in response to an angular velocity indicative of an emergency condition. The invention thereby provides the stability necessary for automobiles to tow heavy trailers with unfavorable trailer to automobile weight ratios, namely, greater than 1 to 1. A slow speed mode provides a soft level of dampening which allows the vehicles to pivot relatively freely except for extreme angular velocities indicating the existence of a low speed emergency, calling for increased turning resistance and the application of trailer brakes.

A brake control prevents sway braking actions at angular velocities and speeds below those at which such actions are helpful. The invention thus provides an apparatus which automatically applies anti-sway braking action only when the angular velocity of a relative turning movement is above a predetermined rate and vehicular speed is above a predetermined minimum.

The foregoing objects and advantages of the invention are accomplished by a stabilizer assembly with fluid pressure units connected between the towing and towed vehicles on either side of a conventional towing connection. Each pressure unit includes a piston and a cylinder defining a chamber for compressing a fluid. The piston preferably has a telescopic shank cooperating with connecting linkages and couplings in an arrangement that transmits stabilizing forces directly to the main beams of the tow vehicle while permitting vehicles to turn relative to each other through angles of 70 degrees or more on either side of center. The arrangement is also such that the pressure units resist relative turning movements in compression but not in extension so as to minimize the amount of resistance opposing return of the vehicles to the neutral position with their longitudinal axes in alignment. Another important feature of the invention is the provision of means for constantly maintaining an extensible bias between the pistons and cylinders to automatically remove mechanical slack from connections between the pressure units and the respective vehicles. For added stability about the pitch and roll axes, the line along which stabilizing forces are transmitted may be offset above or below the pitch axis of the tow bar connection.

The inventor has found that with zero slack, the pressure pattern of fluid in the pressure units is a precise indicator of normal versus abnormal trailer operation and can produce the fluid flows required for sway control. A fluid system is therefore provided with conduits and flow control means for permitting and controlling the flow of fluid out of and into the pressure chamber of each unit. Preferably, the fluid system should allow two different rates of outflow, one for a high speed or "stiff" mode and the other for a low speed or "soft" mode. In the preferred embodiment, flow control is accomplished by low speed restrictions for high outflow rates and high speed restrictions for low outflow rates, flow being directed to the appropriate restriction by valving in response to vehicle speed. The flow rates for each mode are such that normal straight-line towing and highway maneuvers at high speeds and normal turning maneuvers at low speeds will produce relatively low pressures. However, pressures increase rapidly with the forces produced by excessive sway in either mode and this provides an excellent means for controlling angular turning rates between the vehicles and preventing unsafe sway oscillations, particularly at high speeds where such control has not heretofore been practicable. Check valves provide for rapid fluid return to pressure chambers upon depressurization subsequent to stabilizing action.

Brake control means is provided for emergency actuation of towed vehicle brakes in response to fluid pressure in the pressure units. Towed vehicle braking is first initiated at a low pressure set point, and then the braking force increased in response to increasing fluid pressure up to a high pressure set point at which an additional increment of emergency braking force is applied. The level of braking force at all set points is adjustable and means is provided for a limited range of adjustment from the driver's station in the tow vehicle. The range of braking force adjustment available at the driver's station is also adjustable in accordance with the weight of the towed vehicle on which the invention is to be used. Test circuitry actuated at the same station allows actual testing of the braking force adjustments. Towed vehicle braking is also dependent upon vehicle speed in two different ways. First, the brake control means is not activated until that speed approaches the crossover range described above. Secondly, the level of braking force is a function of fluid pressure which in turn has two different modes of response to angular turning velocity depending on vehicle speed. Brake actuation with the fluid system in its low speed mode requires a violent turning or sway maneuver. Ordinary low speed turning maneuvers, such as those encountered in turning corners, parking or backing the vehicles, will not cause brake actuation. On the other hand, brake actuation is much more sensitive to angular velocity when the fluid system is in its high speed mode where small angular velocities generate much higher pressures.

Visual and/or audible indicators at the driver's station in the towing vehicle may be used to advise the operator when the stabilizer is in its high speed mode and upon actuation of the sway brakes. Means also may be provided to insure that the stabilizer remains in its low speed mode in the event of a component failure since low speed turns cannot be executed in the high speed mode.

BRIEF DESCRIPTION OF THE DRAWINGS

The invention is illustrated in the accompanying drawings in which.

BEST MODE FOR CARRYING OUT THE INVENTION

Figure 1:
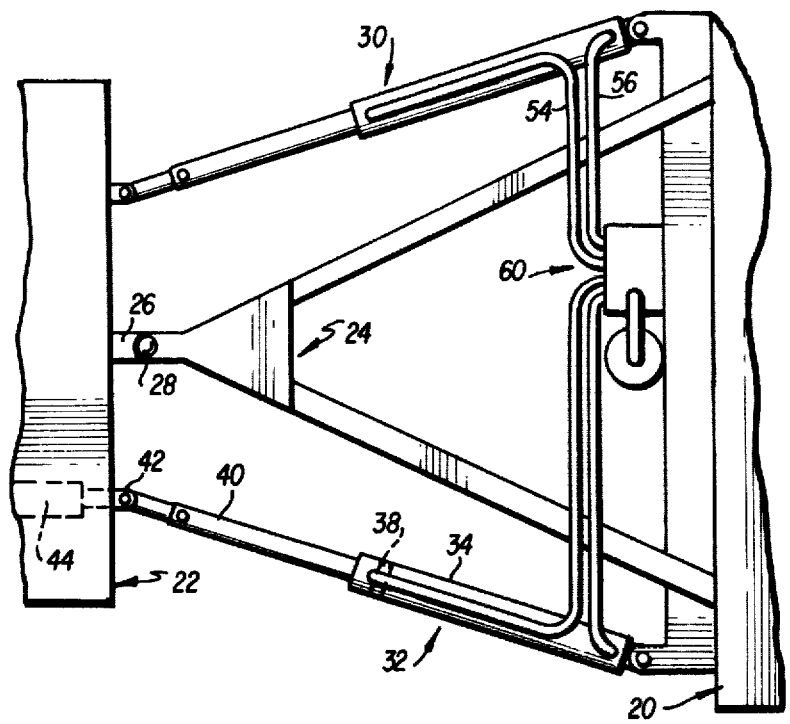
FIG. 1 is a plan view of the towing connection between a towing vehicle and a towed vehicle illustrating the hydraulic units of the invention in their straight-ahead or neutral position.
Figure 2:
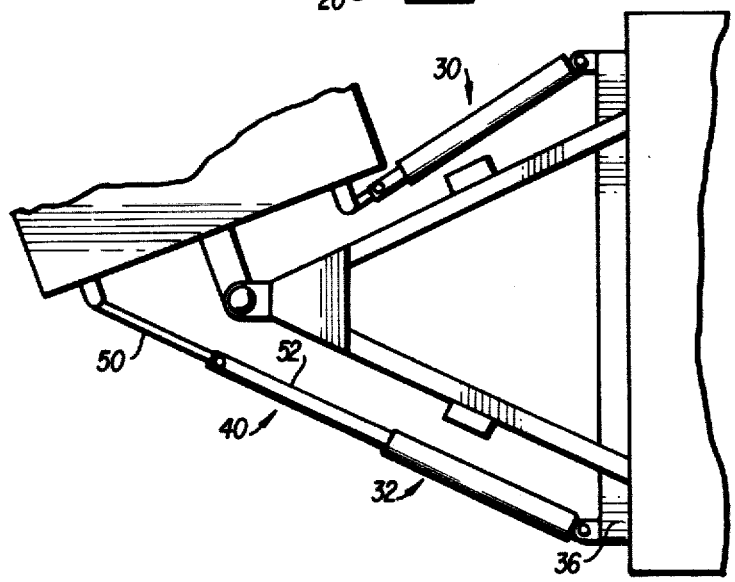
FIG. 2 is a plan view of the towing connection of FIG. 1 illustrating the position assumed by the hydraulic units during a relative turning movement between the vehicles to the right.
Figure 3:
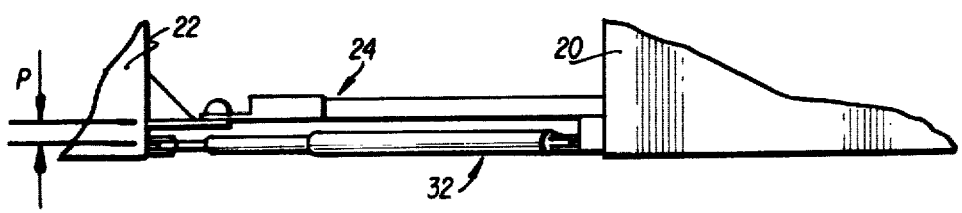
FIG. 3 is an elevational view of the towing connection with the hydraulic units in the neutral position of FIG. 1.

One embodiment of the present invention is shown in FIGS. 1 through 5 of the drawings. A towed vehicle 20, such as a trailer, is connected to a tow or towing vehicle 22, such as an automobile, by means of a conventional tongue or tow bar 24 which detachably engages a hitch plate or beam 26 at the rear of the towing vehicle by means of a ball joint 28. A pair of hydraulic units, generally designated 30 and 32, are mounted on either side of the tow bar. Each hydraulic unit is comprised of a pressure cylinder 34 pivotally connected to either the tow bar or trailer frame by a cross bar 36, and a piston 38 slidably carried within the cylinder and having a piston rod 40 pivotally connected to the frame of the towing vehicle by a bracket 42. The piston rod bracket is preferably mounted on and aligned with the longitudinal main frame beam 44 on the corresponding side of the towing vehicle. On conventional automobiles and other light tow vehicles, there are usually two main beams spaced laterally apart by a distance of approximately 3 feet with the hitch plate mounted halfway therebetween. Because these two beams are the main load carrying members of the tow vehicle frame, this arrangement provides an extremely sturdy connection and a load path capable of handling large stabilizing forces with little flexure or rebound. As illustrated in FIG. 3, the load path of the hydraulic units is preferably beneath that of the tow bar by a distance "P". This distance represents a moment arm through which the stabilizing forces of the hydraulic units contribute to pitch stability of dampening relative movement between the two vehicles about the horizontal pitch axis. Roll stability is also enhanced as some dampening will occur during relative movement of the vehicles about the roll axis.

With reference to FIG. 2, each piston rod 40 is comprised of an extensible shaft 50, and a tube shaft 52, the extensible shaft being telescoped completely within the hollow tube shaft (bottomed out) when the vehicles are in the straight-ahead, neutral position of FIG. 1. As the tow vehicle turns relative to the trailer to the position of FIG. 2, the extensible shaft 50 of hydraulic unit 32 slides out of the tube shaft 52 after the piston 38 has reached the limit of its forward travel in cylinder 34. At the same time, the extensible shaft of hydraulic unit 30 is placed in compression and being bottomed out in the tube shaft causes the piston to travel rearwardly in the pressure cylinder as described further below. As the piston slides within the cylinder of unit 30, fluid is drawn into the forward end of the cylinder through a line 54 and discharged from the rear end of the cylinder through a line 56, the lines extending from the cylinder to a flow control unit, generally designated 60, mounted on the towed vehicle.

Hydraulic Fluid System

The hydraulic units produce stabilizing forces by compressing hydraulic fluid and causing it to flow through a novel fluid system for controlling the rate of flow. One form of the hydraulic fluid system of the invention is shown schematically in FIG. 4. Fluid flow rates are controlled primarily by flow restrictions in the form of a low-speed orifice 62 in bypass line 64 and a high-speed orifice 66 in piston 38, these flow passages connecting a pressure chamber 68 on the rear side of piston 38 to a reservoir 70. The fluid system for each hydraulic unit is identical. The upper hydraulic unit 30 corresponds to the right hydraulic unit of FIG. 1 and the lower hydraulic unit 32 corresponds to the left hydraulic unit of that figure. The fluid system has two operating modes controlled by a solenoid valve 76 in a pressure line 78 connecting bypass 64 to pressure chamber 68. The system is in its low speed or "soft" mode when the solenoid valve is open and in its high speed or "stiff" mode when the solenoid valve is closed. So that the system will remain in the soft mode if the valve actuator fails, the solenoid valve is biased open and actuated to its closed position in response to vehicle speed as subsequently described.

During a turning or sway movement to the right in the soft mode, fluid is pumped by rearward piston movement from the pressure chamber of unit 30 to the reservoir 70 through low-speed orifice 62. Simultaneously, fluid is drawn into a forward surge chamber 80 in unit 30 from the reservoir through a surge line 82. At the same time, fluid is drawn by forward piston movement into the pressure chamber 68 of unit 32 through a check valve 84 in the piston head and a check valve 86 in a return line 88. Simultaneously, fluid is pumped from the forward surge chamber of unit 32 through the surge line 82, either into reservoir 70 or to the surge chamber of unit 30.

For a turning or sway movement to the right with the system in its stiff mode, solenoid valve 76 is closed so that fluid cannot be pumped to the reservoir through bypass line 64. Instead, fluid in the pressure chamber of right unit 30 can flow only through the high speed orifice 66, thereby creating high fluid resistance to any such turning or sway movement. However, the piston in the left unit 32 is still free to move forward by reason of the check valve flow paths such that the hydraulic units generate turning resistance in compression but not in extension. Although two check valves are shown to insure free movement of the pistons during extension, one is sufficient. These check valves preclude reverse flow during the compression stroke of the pistons. It is also to be understood that each of the fluid system components may be comprised of either external lines or internal passaageways, and similarly that many of the components instead of being separate may be within the piston and cylinder of the hydraulic unit itself. For example, the reservoir need not be a separate component. Instead, the bypass line containing the solenoid valve and low speed orifice may run between the pressure chamber and the surge chamber so that the forward end of the cylinder serves as the reservoir for fluid displaced by piston movement.

Brake Control System

Figure 4:
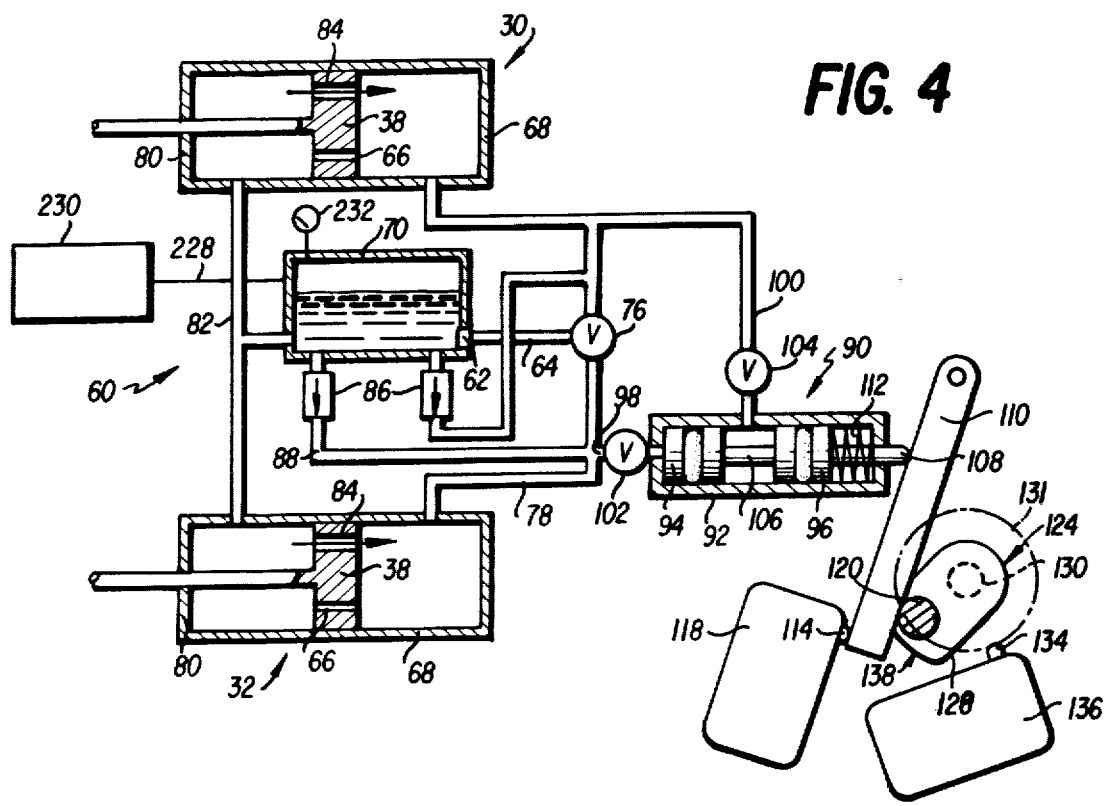
FIG. 4 is a diagramatic illustration of the hydraulic fluid system of the invention.
Figure 5:
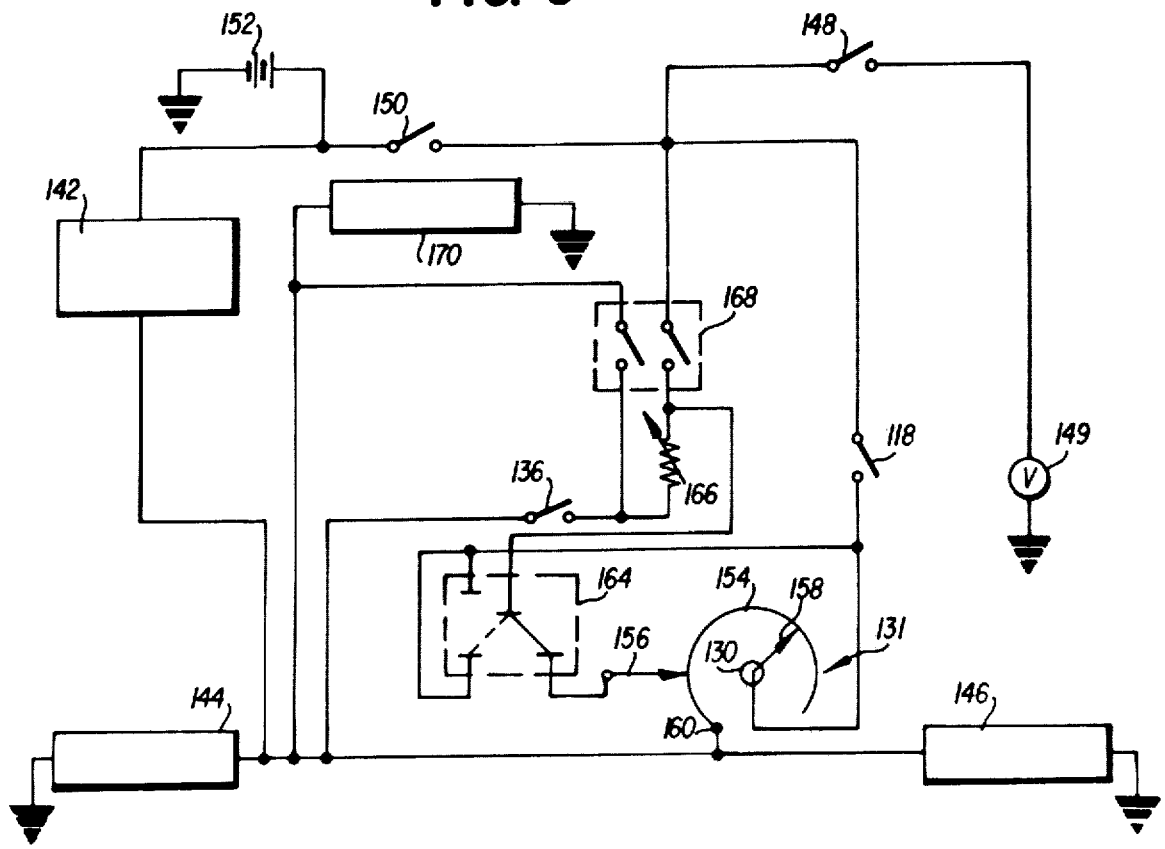
FIG. 5 is a schematic diagram illustrating the electrical components and circuitry of the towed vehicle brake control system of the invention.

A novel brake control system for the towed vehicle is shown schematically in FIGS. 4 and 5. With reference to FIG. 4, the control system includes a pressure actuator, generally designated 90, comprised of a fluid cylinder 92 with two sliding pistons 94 and 96. A first cylinder chamber to the left of piston 94 is connected by an actuator line 98 to pressure line 78 of hydraulic unit 32. A second cylinder chamber between pistons 94 and 96 is connected to the pressure line 78 of the hydraulic unit 30 by an actuator line 100. The actuator lines 98 and 100 preferably include pressure relief valves 102 and 104, respectively, as overpressure protection in the event of a pressure increase approaching design parameters of the fluid system. Pressure applied to piston 94 is transmitted to piston 96 by a plunger 106. A plunger 108 on piston 96 in turn rotates a pivotally mounted link 110 when pressure applied to either piston exceeds the tension of a compression spring 112, both pistons moving together in response to pressure in unit 32 and piston 96 moving alone in response to pressure in unit 30. In the preferred embodiment, the pressure required to initiate movement of pivotal link 110 is approximately 500 psi. As pivotal link 110 rotates counterclockwise, a button 114 is released to turn on a low pressure switch 118 which applies a first increment of power to electric brakes on the wheels of the towed vehicle. Counterclockwise rotation of pivot link 110 also causes movement of a cam follower 120 which in turn rotates a cam, generally designated 124. The cam includes an outer arm 126 and an inner arm 128 on either side of cam follower 120 as seen best in FIG. 8. Inner arm 128 is connected to a shaft 130 of a rheostat 131 to vary the braking force in response to pressure as described in greater detail below. At a second predetermined pressure, preferably about 700 psi, the pivot link will have rotated cam 124 by an amount sufficient for outer cam arm 126 to contact a button 134 and turn on a high pressure switch 136, which applies another stepped increment of power to the towed vehicle brakes. Even after actuation of high pressure switch 136, an even greater level of braking force can be applied through rheostat 131 because the rotation of shaft 130 may continue as button 134 travels along the periphery of an arcuate surface 138 on the cam arms. In the preferred embodiment, the relative travel of the components is such that piston 96 reaches the limit of its outward travel in cylinder 92 as button 134 nears the clockwise end of cam surface 138.

As can be readily understood, the fluid system described can be used directly to actuate hydraulic brakes instead of electric brakes on the towed vehicle. In such application, individual brake cylinders of the hydraulic brakes would be actuated by the pressurized fluid in a manner very similar to actuation of pressure actuator 90 as just described. Conventional brake cylinders have a piston at either end defining a central chamber to which pressurized fluid from either hydraulic unit could be applied. In this instance, the plungers of the brake cylinder pistons extend outwardly from opposite ends of the cylinder so as to act against corresponding brake shoes.

An electrical circuit for controlling electric brakes through the pressure actuator 90 is shown schematically in FIG. 5. The designation 142 refers to the conventional brake control usually associated with standard electric brake systems. This brake control is actuated manually by the driver of the towing vehicle for normal stopping maneuvers and is independent of the sway brake control system of the present invention. Similarly, the electric components for actuating the brake shoes, designated 144 and 146, are of a conventional nature and do not form a part of this invention. Also shown schematically in FIG. 5 is a speed switch 148 which is driven by the speedometer drive of the two vehicle and closes when the speed of the vehicles reaches approximately 37 miles per hour. The closure of switch 148 energizes the solenoid 149 of valve 76 to place the fluid system of FIG. 4 in its high speed mode as previously described.

The remaining components of FIG. 5 comprise the electrical portion of the sway brake control system of the present invention. When the speed of the vehicles reaches approximately 30 miles per hour, an on-off speed switch 150 closes to connect the electrical system to a source of power 152, which may be the battery and generator system of the two vehicle or a separate battery carried by the towed vehicle. The on-off switch 150 is activated by the tow vehicle's speedometer drive in the same manner as the solenoid switch 148. Since the solenoid switch does not close until a speed of about 37 miles per hour is achieved, there is a speed range from 30 to 37 miles per hour when the brake control system is in what will be referred to as its low speed mode. Since the solenoid valve 76 is open, the vehicles can execute normal low speed maneuvers requiring large angle changes without generating sufficient pressures in the fluid system to close the low pressure switch 118. However, extremely violent maneuvers of an abnormal nature in the low speed range will produce flow rates sufficiently in excess of that allowed by low speed orifice 62 to raise system pressures to 500 psi and above. Thus, even in the low speed mode, the brake control system will provide at least the first increment of trailer braking force upon closure of low pressure switch 118 in response to dangerous low speed maneuvers.

At speeds of 37 miles per hour and above, the sway brake control system is also placed in a high speed mode by the closure of solenoid valve 76. In this mode, the full range of braking functions is available to control dangerous levels of high speed sway. Thus, any rapid movement of the pistons within the hydraulic cylinders is indicative of the approach of a dangerous sway condition and will close the low pressure switch to initiate braking action. The magnitude of the braking force applied upon closure of switch 118 depends upon rheostat 131 which includes a resistance coil 154, a preset wiper 156 and a movable wiper 158, the latter being carried by shaft 130 which rotates with cam 124. The initial braking force applied by the towed vehicle brakes 144 and 146 is established by the amount of initial resistance between movable wiper arm 158 and a coil output terminal 160. As pressure in the fluid system increases due to increasing trailer sway, the pivot link 110 causes the shaft 130 to rotate counterclockwise as previously discussed in reference to FIG. 4. Rotation of shaft 130 causes movable wiper 158 to rotate toward terminal 160 and thereby decrease the resistance in the circuit and increase power to the trailer brakes. Fixed wiper 156 is positioned around the rheostat coil 154 at a location which approximates the position achieved by movable wiper 158 in response to the pressure at which high pressure switch 136 closes, namely about 700 psi. At the same time that low pressure switch 118 closed, a normally closed relay 164 opened to also supply power to a second rheostat 166 which establishes the amount of resistance in a parallel circuit containing the high pressure switch 136. Thus, the closure of high pressure switch 136 places rheostats 131 and 166 in parallel, resulting in a stepped increase in the power applied to towed vehicle brakes 144 and 146. Further rotation of shaft 130 after the closure of high pressure switch 136 will further reduce resistance in the parallel circuits as movable wiper 158 travels from the position of fixed wiper 156 toward the end of the resistance winding at terminal 160.

The sway brake control system also includes means for adjusting the braking force to be applied at each pressure level. The towed vehicle rheostat 131 is adjustable by rotating the body of the resistance coil 154 so as to increase or decrease the distance between the rest position of movable wiper 158 and resistance terminal 160, the latter moving with the coil. Since the position of wiper 156 is fixed, the resistance between this wiper and terminal 160 is similarly adjusted. The rheostat 131 may be located on the towed vehicle and is preferably adjusted by a manufacturer or dealer in accordance with the weight of the towed vehicle. Rheostat 166 may be located at the driver's station in the tow vehicle and its resistance range is preferably selected for adjustment up to or just short of the resistance value that will produce sliding of the trailer tires on dry pavement. In use, the driver of the tow vehicle adjusts rheostat 166 to the point where the power supplied to the trailer brakes is just short of that which would produce sliding on the roadway at the then prevailing weather and road surface conditions. So that this arrangement can be readily accomplished, the circuit includes a test swtich 168. When switch 168 is closed, the driver rheostat 166 is placed in a test circuit which is in parallel with a special circuit connected to towed vehicle rheostat 131 through normally closed relay 164. As indicated above, fixed wiper 156 is at the point on resistance coil 154 achieved by movable wiper arm 158 in response to the pressure level closing high pressure switch 136. Thus, when test switch 168 is closed at a speed above that required to close power switch 150 (30 miles per hour), current flows to the towed vehicle brakes through relay 164 and the resistance of coil 154 between fixed wiper 156 and terminal 160, and also through the parallel test circuit containing driver rheostat 166. In this manner, the test switch 168 simulates the level of braking force that would be called for by a sway condition of sufficient magnitude to close both pressure switches. The test circuit may also include a volt meter 170 to give a visual indication of the relative power applied to the brakes over the range of adjustment provided by the driver rheostat.

Flow Control Mechanism

Figure 6:
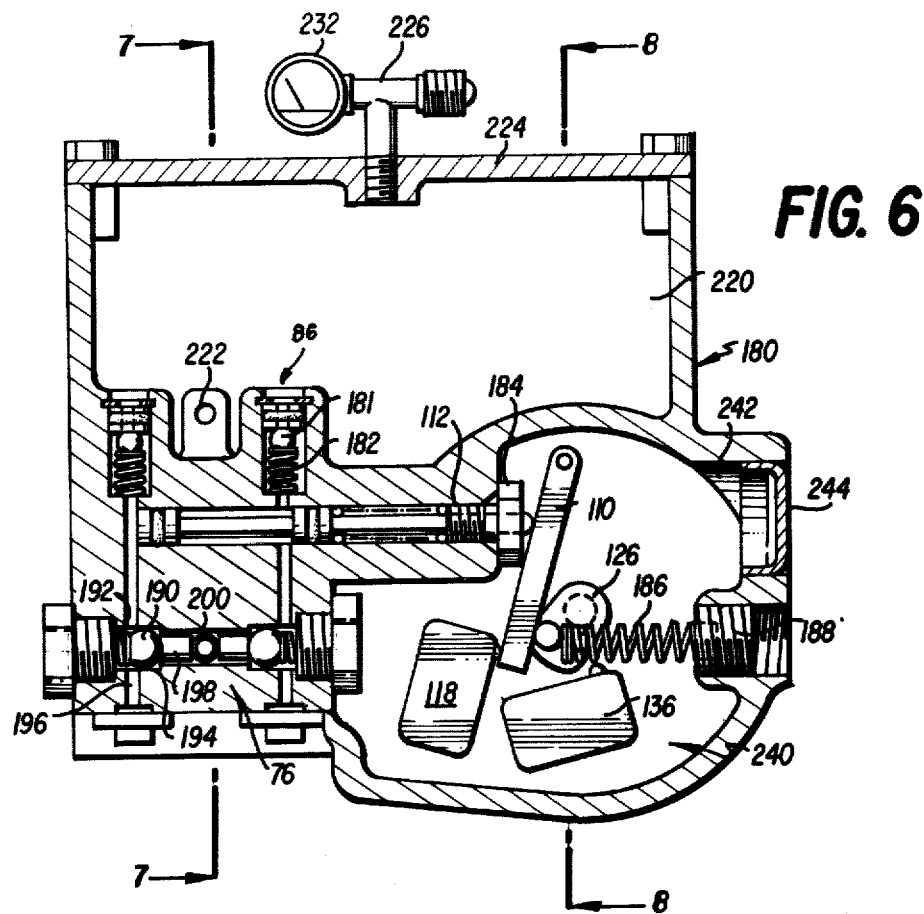
FIG. 6 is an elevational view in section of an integral housing containing certain components of the fluid and brake control systems of the invention.
Figure 7:
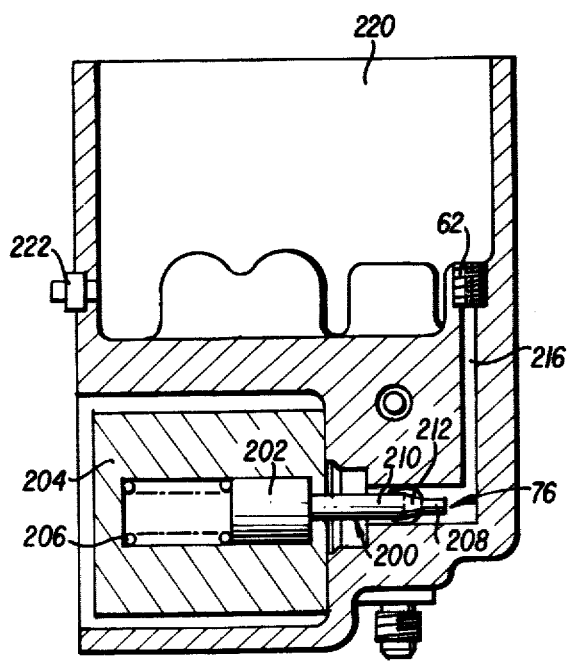
FIG. 7 is a sectional view of the housing taken along line 7—7 of FIG. 6.
Figure 8:
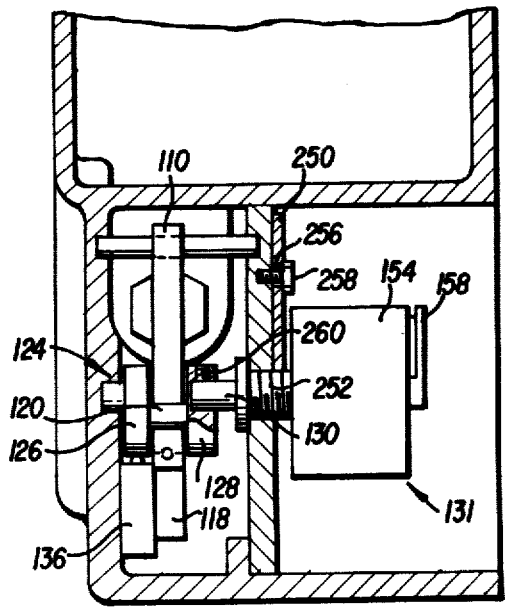
FIG. 8 is a sectional view of the housing taken along line 8—8 of FIG. 6.

In FIGS. 6, 7 and 8, there is shown a preferred embodiment of a flow control mechanism incorporating some of the components shown schematically in FIG. 4 into an integral housing 180. The same part designations are used for the components that appear both schematically in FIG. 4 and in the housing 180. Valves 86 may be conventional ball check valves comprised of balls 181 and springs 182. An adjustment nut 184 has been provided in the plunger end of the pressure actuator cylinder to allow adjustment of the tension in return spring 112. An additional spring 186 adjustable by a threaded plug 188 may be provided to supplement the spring force that must be overcome in order to rotate pivot link 110.

Solenoid valve 76 is incorporated in the housing in the form of a ball type valve having balls 190 biased by springs 192 toward valve ports 194. Each valve port is connected by a passageway 196 to a corresponding housing port for receiving pressurized fluid from the pressure chambers of the respective hydraulic units. The ball valves reciprocate between their open and closed positions in response to sliding movement of plungers 198. A valve shaft 200 is carried by a movable head 202 traveling within a solenoid coil 204. The valve shaft is biased outward into its valve opening position by a compression spring 206 acting on head 202. The outer periphery of the valve shaft serves as a cam surface for reciprocating the sliding plungers 198, an outer section 208 of minimum diameter permitting the ball valves to close and an inner section 210 of maximum diameter holding the valves open. An intermediate section 212 is tapered and serves as a camming surface for moving the plungers between their open and closed positions. The passageways in which the plungers and piston reciprocate are of sufficient diameter to allow fluid passing the ball valves to flow freely into a passageway 216 containing low speed orifice 62. Fluid then flows into a chamber 220 of reservoir 70 as shown best in FIG. 7. Fluid from the forward or surge chamber end of the hydraulic units 30 and 32 has access to the reservoir chamber 220 through a surge port 222 to which the surge lines 82 are connected. The reservoir chamber is closed by a cover 224 bolted to the top of the housing and this cover contains a connection 226 for an airline 228 from a source of high pressure air 230. An air pressure gauge 232 may also be connected to the air space of reservoir chamber 220 through connection 226.

Reservoir housing 180 also contains an electrical switch cavity 240 for the electrical components actuated by pivotal link 110. This cavity has an access port 242 closed by a sealing insert 244.

As shown best in FIG. 8, the coil 154 of rheostat 131 is adjustable relative to movable wiper 158 by means of an adjustment plate 250 extending radially outward from a coil support column 252. Plate 250 preferably is pie-shaped in the radial plane in which it extends and has an arcuate slot 256 with an adjustment screw 258 to allow adjustment of the plate and coil around the axis of rheostat shaft 130. As also shown in this figure, the low pressure and high pressure switches are on different levels relative to the axis of cam 124 so that the low pressure switch can be engaged by pivot link 110 and the high pressure switch by cam arm 126. The inner cam arm 128 is secured to the rheostat shaft 130 by a set screw 260.

Slack Removal Mechanism

For the reason previously discussed, the slightest change in angle between tow vehicle and trailer at speeds above about 37 miles per hour can produce a drastic change in the direction of the vehicles so that sway control must be initiated at angle changes of less than 1 degree. In order to accomplish this with conventional couplings and connecting linkages, these connections must be "pre-loaded", preferably by biasing the hydraulic units toward their extended position. In the embodiments of FIGS. 4 and 6, the necessary bias is achieved by pressurizing the reservoir 70 with high pressure air from source 230. Reservoir pressure thereby maintains an extension force between the pistons and cylinders of the hydraulic units and this force preloads the stabilizer linkages as long as the telescopic sections of the piston rod are bottomed out. The telescoping components of the piston rod maintain a bottomed out relation until the piston on the outside of a turn reaches the forward end of the pressure cylinder, which preferably occurs at a turning angle of about 10 to 15 degrees. The sway sensitivity necessitating zero slack is not usually required above this turning angle because sway control at high speed must be adequate to prevent angles of less than 10 degrees in order to avoid vehicle upset. The air pressure in the fluid reservoir must be sufficient to overcome hydraulic pressure drops in the intervening valves and passages of the fluid system and apply a pre-load of about 50 to 100 pounds to the stabilizer connections.

Figure 9:
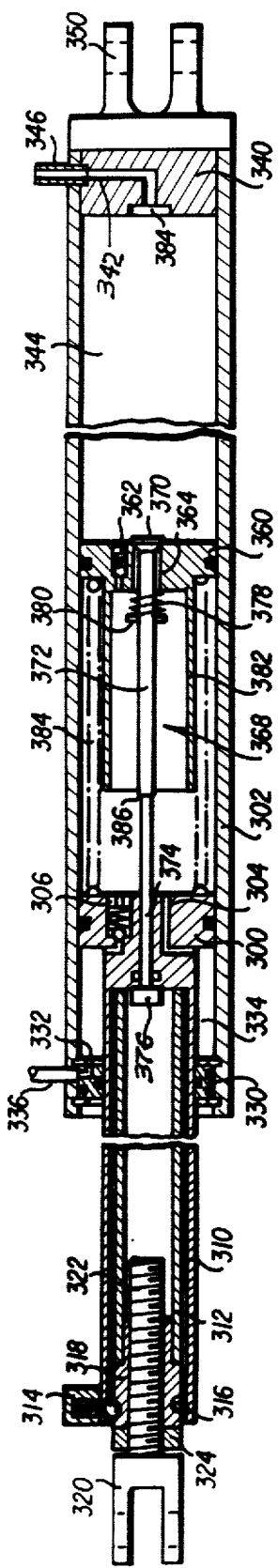
FIG. 9 is a fragmentary sectional view of a modification in the internal structure of the hydraulic unit of the invention.
Figure 10:
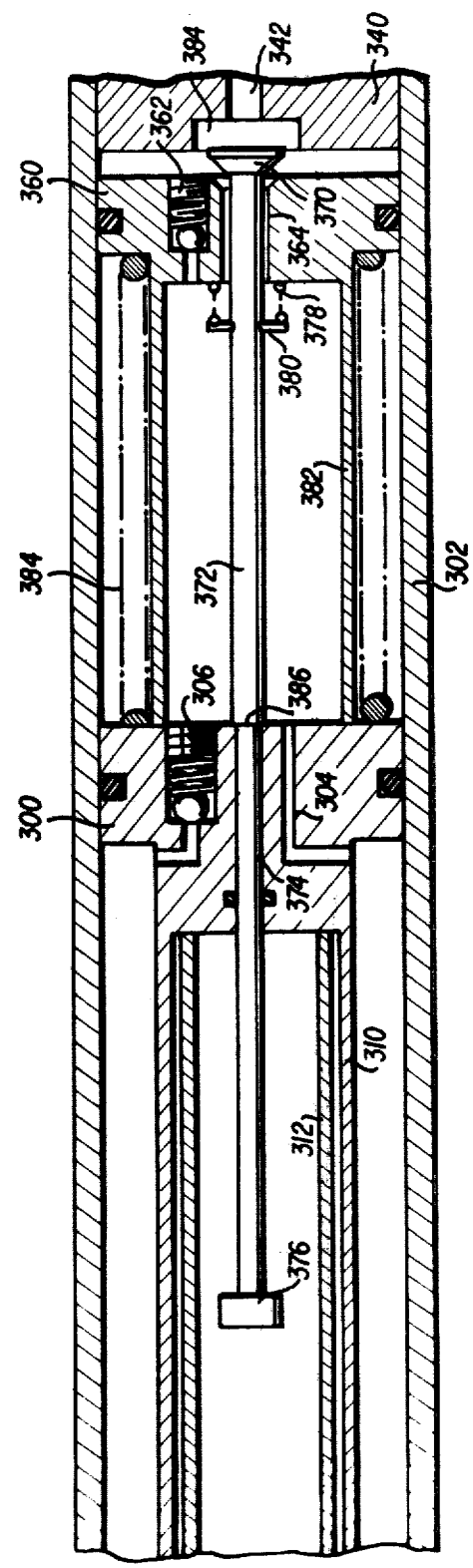
FIG. 10 is a fragmentary sectional view of a portion of the hydraulic unit of FIG. 9 enlarged to show more clearly certain structural features of the invention.

Another embodiment of the invention for pre-loading the stabilizer connections is illustrated in FIGS. 9 and 10, the former showing biasing components within the hydraulic units in their neutral, unloaded position prior to any vehicle movement and the latter showing those components in their loaded position for biasing the piston and cylinder apart. A piston 300 serves to compress hydraulic fluid in a cylinder 302 to provide the stabilizing forces previously described. The piston has a high speed orifice 304, a check valve 306, and carries a telescoping piston rod comprised of a tube shaft 310 and an extensible shaft 312. The extensible shaft is releasably held within the tube shaft by a ball detent connection 314 which engages a groove 316 in an extensible shaft head 318. The shaft 312 includes a coupling 320 for pivotally connecting the piston to a towing vehicle. Coupling 320 may have a threaded shank 322 and a lock nut 324 to provide for adjustments in the length of the extensible shaft.

The pressure cylinder 302 includes a forward closure 330 having a surge port 332 connecting a forward chamber 334 to a surge line 336. A rear cylinder closure 340 has a pressure port 342 connecting a rear pressure chamber 344 to a pressure line 346. Surge line 336 and pressure line 346 connect the respective chambers to the reservoir 70 previously described. The rear end of the cylinder carries a coupling 350 for pivotally connecting the cylinder to a towed vehicle.

In the normal straight-ahead position, piston 300 is spaced to the rear of forward closure 330 by a distance sufficient to accommodate 10 to 15 degrees of outside turning angle before the piston is pulled into abutment with the closure. In the preferred embodiment, this distance is approximately 2½ inches. To the rear of piston 300 is a second biasing piston 360 having a check valve 362 and a central port 364. The flow of fluid through central port 364 is controlled by a poppet, generally designated 368, having a valve head 370 for closing port 364, an elongated shaft 372 slidingly received in a sealed journal 374 extending through and along the axis of pressure piston 300, and an enlarged base 376 at the forward side of piston 300 which cooperates with valve head 370 to limit the distance separating the two pistons. A compression spring 378 engages a pin 380 mounted in the poppet shaft so as to bias the valve head toward its closed position. Piston 360 carries a hollow tubular shaft 382 which is concentric to the poppet shaft 372. Concentric to shaft 382 is a relatively large and stiff compression spring 384 held between the rear face of piston 300 and the forward face of piston 360.

In an unloaded condition without vehicle motion, the biasing spring 384 holds the two pistons apart at the full distance permitted by the poppet. In the low speed mode with solenoid valve 76 open, the distance between the pistons is maintained and piston 360 closely follows the movement of piston 300 due to the relatively high force of spring 384. Fluid is thus pumped back and forth between the reservoir and the cylinder with little pressure buildup in pressure chamber 344. In the high speed mode, flow through port 342 is prevented by closure of the solenoid valve and fluid is thereby trapped in chamber 344, preventing any rearward movement of piston 360. However, during normal vehicular movements at high speed, small angular movements between the towed and towing vehicles will be constantly occurring. These are transmitted by the piston rod to piston 300 and cause it to oscillate in cylinder 302. In response to the extension portion of these movements, piston 300 is pulled toward the forward end of the cylinder by extensible shaft 312 acting through detent connection 314. At the same time, piston 360 is pulled forward by the same amount as piston 300 acts through poppet 368. Forward movement of piston 360 draws fluid into chamber 344 from the reservoir through the check valves of the fluid system. On the other hand, during the compression portion of these movements, piston 360 is held at its forward most position of travel by the fluid trapped in chamber 344 and piston 300 is pushed closer to piston 360 as fluid flows through high speed orifice 304 and thence to the low pressure surge chamber 334 on the forward side of piston 300. This further compresses spring 384 and moves piston 300 away from the abutment provided by poppet base 376, thereby allowing the highly compressed spring to generate an extension bias between piston 300 and cylinder 302 which pre-loads the stabilizer connections. A single, relatively small angular movement of less than one degree is sufficient to release piston 300 from abutment 376 and produce the necessary pre-loading for zero slack.

As high speed turning maneuvers should not result in turning angles between the vehicles of greater than 5 to 10 degrees, the hydraulic system is preferably designed to accommodate the maximum pressures corresponding to such angle changes. However, should the solenoid valve fail to open as speed decreases below its set point, larger angle changes at low speeds could produce excessive fluid pressures. In order to prevent overpressurization of chamber 344 and the components connected thereto, the rear face of piston 300 engages an annular shoulder 386 on poppet shaft 372 just before continued rearward travel of piston 300 would cause it to bottom out against the hollow shaft 382 of piston 360. This causes poppet shaft 372 to travel rearwardly with respect to piston 360, compressing spring 378 and opening poppet valve 370 to provide a pressure relief path from chamber 344 through poppet port 364 and high speed orifice 304. Once piston 300 bottoms out against shaft 382 and poppet valve 370 opens, the two pistons will travel together toward the rear of the cylinder for whatever distance is required to accommodate the turning maneuver. This condition is illustrated in FIG. 10 which shows the pistons bottomed out against each other near the rear end of the cylinder. The rear cylinder closure 340 is preferably provided with a bore 384 to receive poppet valve 370 in its open position when piston 360 bottoms out against the closure. The preferred stroke of piston 300 relative to piston 360 is about 2½ inches, which is approximately the distance through which piston 300 travels in response to an angle change of 10 degrees.

When vehicle speed drops below 37 miles per hour, solenoid valve 76 again opens to connect chamber 344 to reservoir 70. The resulting release of pressure allows biasing spring 384 to return the pistons to their unloaded positions of FIG. 9. In the unloaded condition, piston 300 abuts against poppet head 376 and there is no biasing force to interfere with connecting or disconnecting the couplings between the hydraulic units and the respective vehicles. Similarly, when the coupling connections of the air pressure embodiments are to be manipulated, the pressure is released from reservoir chamber 220 in order to remove all biasing force from the hydraulic units.

With further reference to FIG. 9, the telescoping sections of the piston rod on the outside of a turn act as one for turns less than 10 degrees because the sections are held together by detent connection 314. However, for turns greater than 10 degrees, piston 300 bottoms out against the forward closure 330 and the detent ball is thereby forced out of groove 316, allowing extensible shaft 312 to telescope out of tubular shaft 310. This telescoping action of the piston rod allows the vehicle combination to make short radius turns at relative turning angles of up to 70 or 80 degrees as required for low speed maneuvers such as turning corners, backing, and parking.

Figure 11:
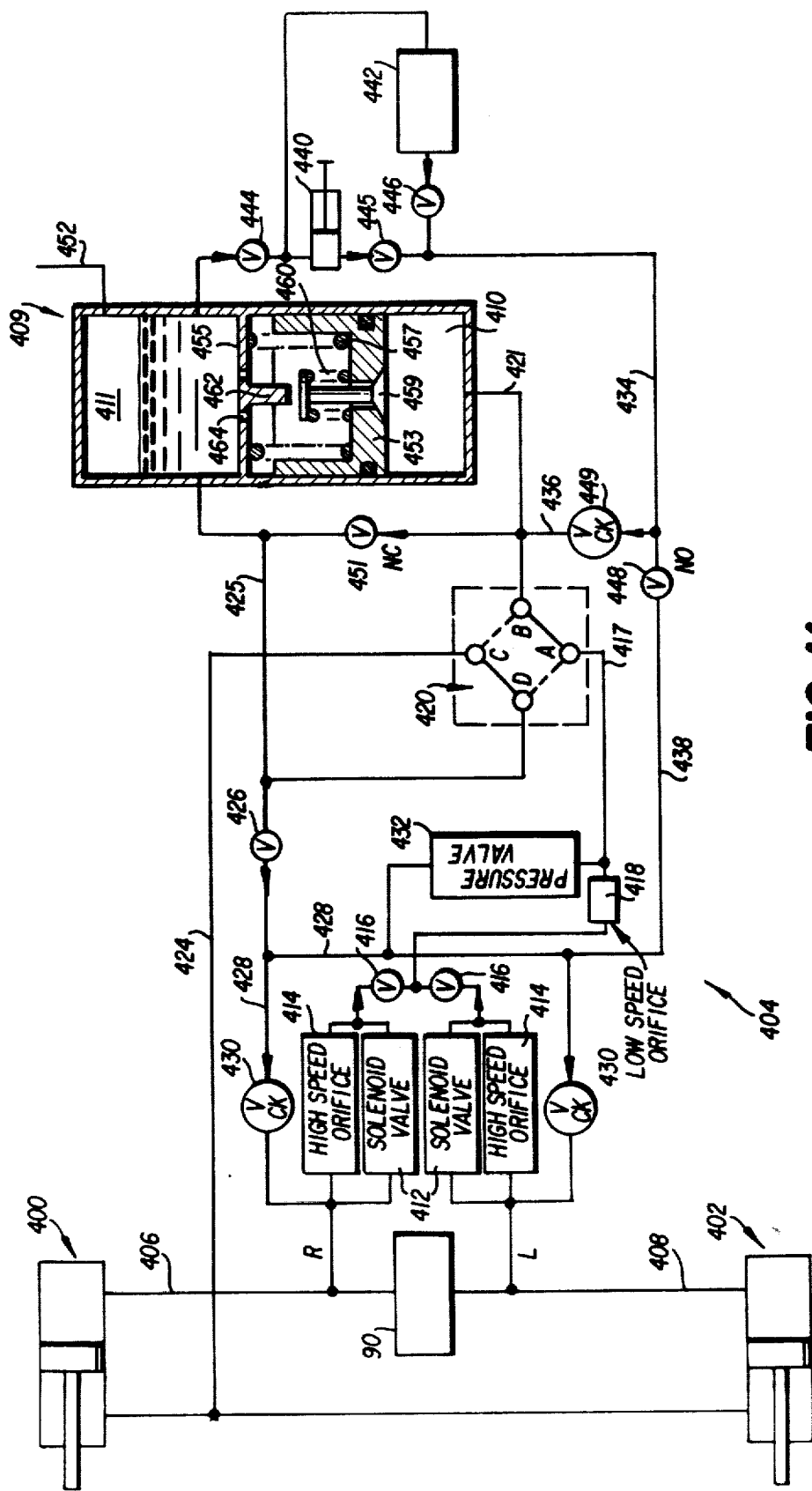
FIG. 11 is a diagrammatic illustration of a modification in the hydraulic fluid system of the invention.

A third embodiment of the slack removal means of the invention is shown diagramatically in FIG. 11. In this embodiment, hydraulic units 400 and 402 take the place of units 30 and 32 in FIG. 4 and a modified fluid flow system, generally designated 404, is employed. Pressure lines 406 and 408 connect the rearward chambers of the respective hydraulic units 400 and 402 to the pressure actuator 90 of the brake control system previously described. These pressure lines are also connected to a combined reservoir and pressure accumulator housing, generally designated 409, having an accumulator chamber 410 and a reservoir chamber 411. The connecting flow path passes first through separate right (R) and left (L) lines each containing a solenoid valve 412 in parallel with an orifice 414 and a check valve 416, and then through a common pressure line 417 containing a low-speed orifice 418, and a four-way valve 420. For purposes of describing the operation of the four-way valve and its relationship to the reservoir-accumulator, the four ports of valve 420 are designated A, B, C and D. The line 417 connects low-speed orifice 418 to port A and a pressure line 421 connects port B to accumulator chamber 410. When the ports of valve 420 are connected as shown by the solid lines in FIG. 11, the valve is in its piston extending position. When those ports are connected as shown by the dotted lines, the valve is in its piston retracting position. The forward surge chamber of each hydraulic unit is connected to reservoir chamber 411 of the eservoir-accumulator by a flow path comprised of a surge line 424, ports C and D of four-way valve 420 and a line 425. The surge line flow path is cross-connected to the pressure line of each hydraulic unit through a common check valve 426 and separate accumulator pressure lines 428 each containing a check valve 430. The direction of flow through each of the check valves is indicated by the arrows shown in FIG. 11. The common pressure line 417 is also cross-connected downstream of the low-speed orifice 418 to the accumulator pressure lines 428 by a line containing a pressure valve 432. Pressure valve 432 is a pressure-actuated stop valve designed to go fully open at a given pressure and then to stay opened until it goes fully closed at a closing pressure which may be the same as or substantially lower than the opening pressure. This valve preferably opens at about 50 psi in line 417 and then stays open until line pressure drops to about 25 psi.

It is to be understood that the stabilizing functions provided by the hydraulic units 400 and 402 in cooperation with associated solenoid valves and high and low speed orifices, and by the brake control system 90, is the same as that previously described for the hydraulic system of FIG. 4. The hydraulic system of FIG. 11 includes special features for maintaining a positive pressure in the pressure chambers of each hydraulic unit without reliance on a source of air pressure. The way in which the system operates to accomplish this preloading function will now be described.

When the hydraulic units are first connected between the respective vehicles, the system is depressurized, this being insured by having a normally closed valve 451 open to cross-connect the accumulator chamber to the reservoir chamber which is vented to ambient pressure through a vent line 452. As soon as the trailer hitch and stabilizer couplings are securely connected, valve 451 is closed. The system is then ready for preloading pressurization. Initial pressurization may be provided by either a hand pump 440 or an electric pump 442. If both of these pumps are desired, they may be installed in parallel, together into appropriate check valves 444, 445 and 446, as shown in FIG. 11. These pumps are optional and both may be omitted if such pressurization is not desired. The pump pressure is transmitted to the pressure chamber of each hydraulic unit through a line 434, a normally open valve 448 and a line 438. This pressure tends to extend the piston of each hydraulic unit, thereby preloading the stabilizer couplings and also the ball joint 28 of the hitch connection itself. Although either pump may be operated for a sufficient time to also fully pressurize the accumulator 410 and open pressure valve 432 as described below, a lower level of preloading may be employed initially in order to minimize such pumping efforts. Full preloading may then be achieved during vehicle operation as described below.

During vehicular travel, the hydraulic units themselves serve as pumps to keep the system pressurized to the desired preloading level. As previously discussed, there is continually at least some degree of relative turning movement between the vehicles when they are in motion. This constant back and forth motion produces the necessary pumping action. Assuming the right hydraulic unit 400 to be first in extension, fluid is drawn into its pressure chamber from reservoir 411 through line 425, common check valve 426 and right check valve 430. When the pressure chamber of the right unit is placed in compression, the fluid previously drawn in is pumped to the accumulator 410 through either high-speed orifice 414 and the solenoid valve 412 or the high-speed orifice 414 alone, depending on the position of the solenoid valve as determined by the speed of the vehicles. During the pumping action, fluid flows freely through lines 424 and 425 between the forward surge chambers of units 400 and 402 and the reservoir. On the other hand, fluid pumped to the accumulator is trapped there by check valves 416—416 as long as pressure valve 432 remains closed. Pressure therefore builds up in the accumulator and an accumulator piston 453 is forced toward a partition 455 and compresses a spring 457 which thereby stores energy for maintaining preloading pressure in the system. As spring 457 is compressed, fluid behind piston 453 flows into reservoir 411 through a series of ports 464 in partition 455. When accumulator pressure reaches approximately 50 psi, pressure valve 432 opens to interconnect line 417 with accumulator pressure lines 428 through which accumulator pressure is then supplied to the pressure chambers of the hydraulic units.

At a somewhat higher system pressure, preferably in the range of 60–100 psi, accumulator piston 453 reaches the limit of its travel against partition 455. This causes an abutment or stop member 462 to open a poppet valve 459 carried by piston 453 and normally biased closed by a spring 460. When the poppet valve is open, further pressure increases are prevented because fluid pumped by the hydraulic units is then dumped to the reservoir through the poppet valve and ports 464. While pressure valve 432 is open fluid is also pumped directly between the pressure chambers of the hydraulic units though the fluid circuit containing common line 417, accumulator lines 428—428, check valves 430—430 and respective unit pressure lines 406 and 408. Thus, for small oscillations of the pistons within hydraulic units 400 and 402, fluid is pumped from one hydraulic unit to the other with the accumulator spring 457 providing a relatively constant pressure bias for slack removal. For large oscillations or other potentially overpressurizing situations, poppet valve 459 serves as a pressure release component for the pressurized side of the hydraulic system.

Four-way valve 420 is normally in the extend position described above where port A is connected to port B and port D is connected to port C. For purposes of disconnecting the stabilizer, four-way valve 420 is rotated to the dashed line position in which port A is connected to port D and port B is connected to port C. This places the valve in its retract position and relieves the pressure in the hydraulic units by connecting the pressure chambers to the reservoir. Normally closed valve 451 is also opened to dump accumulator pressure to the reservoir. Without any pressure in the system, the coupling connections of the stabilizer are easily disconnected along with the hitch connection of the trailer.

In disconnecting the stabilizer, it is preferable to disconnect only the forward end of the hydraulic pistons and then retract the pistons fully into the corresponding cylinders. To accomplish this, four-way valve 420 is left in its retract position and valve 451 and normally open valve 448 are closed. Hand pump 440 or electric pump 442 can then be used to pressurize the surge chamber of each hydraulic unit through a line 436 containing a check valve 449. This will discharge pressure chamber fluid to the reservoir through ports A and D of valve 420 and cause the pistons to move to their fully retracted positions. The four-way valve may then be returned to its normal position and valve 448 and 451 again opened to relieve all pressure from the system for storage. In this condition, the stabilizer is ready to be reconnected to the towing vehicle according to the steps previously described.

The four-way valve 420 and the stop valves 448 and 451 are preferably arranged in the same housing so as to be operated off of a single valve shaft. Plunger actuated ball valves of the spring loaded type shown in FIG. 6 are especially useful in this application. In this unitary design, four-way valve 420 would be comprised of four such ball valves, two normally open to serve the function of interconnected ports A-B and B-C and two normally closed to serve the function of interconnected ports A-D and B-C.

As shown in FIGS. 1 and 2, the pistons of each hydraulic unit preferably have extensible shafts to accommodate the large turning angles associated with low speed maneuvers.

Figure 12:
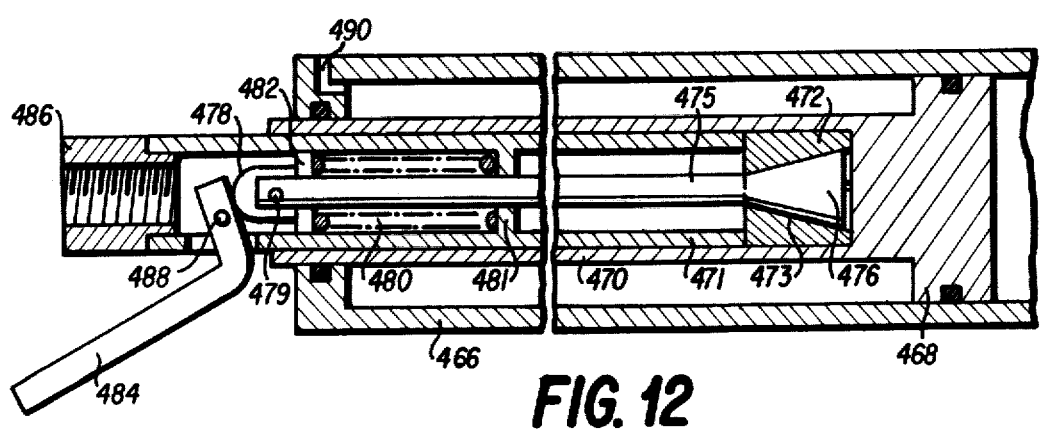
FIG. 12 is a fragmentary sectional view of a modification of the hydraulic units for use with the fluid system of FIG. 11.

The extensible portion of the shaft must be firmly attached to the base portion during all extension movements of the piston within the cylinder in order for the hydraulic units to function properly as pumps for pressurizing the accumulator. A detent and groove attachment similar to that shown in FIG. 9 may be employed to detachably connect the shaft components. However, the preferred structure of the piston shaft for hydraulic units 400 and 402 is shown in FIG. 12 where the cylinder and piston are designated 466 and 468, respectively. In this embodiment, a tubular piston shaft 470 carries an extensible shaft 471. At the rear end of extensible shaft 471 is a segmented disc 472 of friction material such as used in brake linings, the disc preferably being divided into four segments. The segments are held in place by a camming member having an elongated shank 475 and a conical head 476 which engages a conical bore 473 passing through the center of friction disc 472. The forward end of shank 475 is secured to an enlarged boss 478 by a pin 479 and the camming member is biased forward by a spring 480 held between an annular stop 481 on the inner wall of the extensible shaft and an annular washer 482 secured to shank 475 by boss 478.

The frictional engagement produced between disc 472 and tubular shaft 470 by the force of spring 480 is such that any pulling force exerted on extensible shaft 471 by the towing vehicle will cause piston 468 to move forward in cylinder 466 and thereby draw fluid into the pressure chamber on the rear side of the piston. On the other hand, the force of spring 480 should be limited to the extent permitting extensible shaft 471 to be readily extended from within tubular shaft 470 when piston 468 reaches the forward end of cylinder 466. When the hydraulic units are to be disconnected from the towing vehicle, the extensible shaft can be unlocked from the tubular shaft by compressing a lever 484 so that it pivots about a connecting pin 488 and presses against boss 478. This compresses spring 480 and shifts the camming member to the rear so as to release disc 472 from locking engagement with the inner wall of the tubular shaft 470. Upon release of disc 472, extensible shaft 471 telescopes freely within piston shaft 470 so that the coupling (not shown) carried by a forward shaft head 486 can be easily positioned for either connecting or disconnecting the stabilizer. This arrangement allows the use of accumulator pressure to retract the hydraulic pistons. The procedure is the same as above except valve 451 remains closed until after retraction. The release and free extension of shaft 471 allows the couplings to be disconnected while piston 468 and integral shaft 470 are being retracted by the application of accumulator pressure through line 424.

Hydraulic cylinder 466 has a forward surge port 490 for connecting the surge chamber to the surge line 424 of FIG. 11. The other structural details of the cylinder and of the couplings at each end for connecting both the piston and the cylinder to the appropriate vehicles are identical to those employed in the embodiment of FIG. 9.

ALTERNATE EMBODIMENTS OF THE INVENTION

Figure 14A:
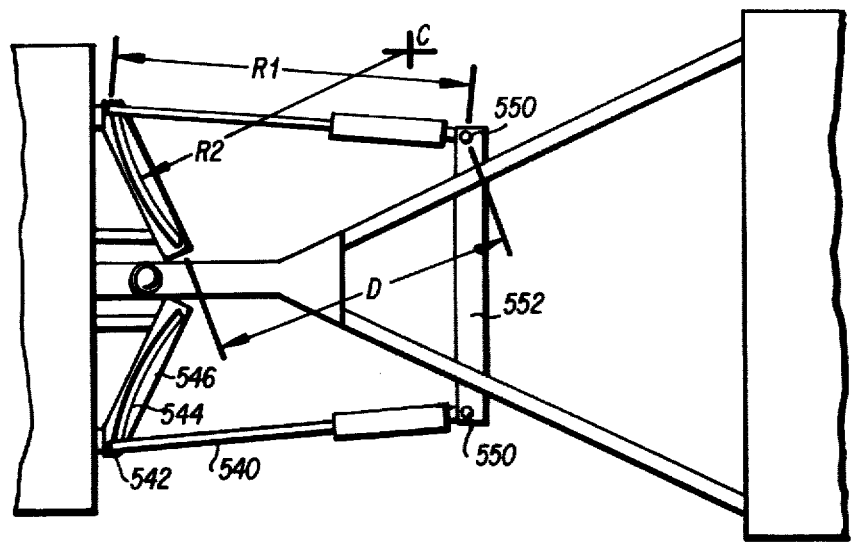
FIGS. 14A and 14B are plan views of the towing connection illustrating another modification in the linkages connecting the hydraulic units between the two vehicles, the linkages being shown in the straight-ahead and right turn positions, respectively.
Figure 13A:
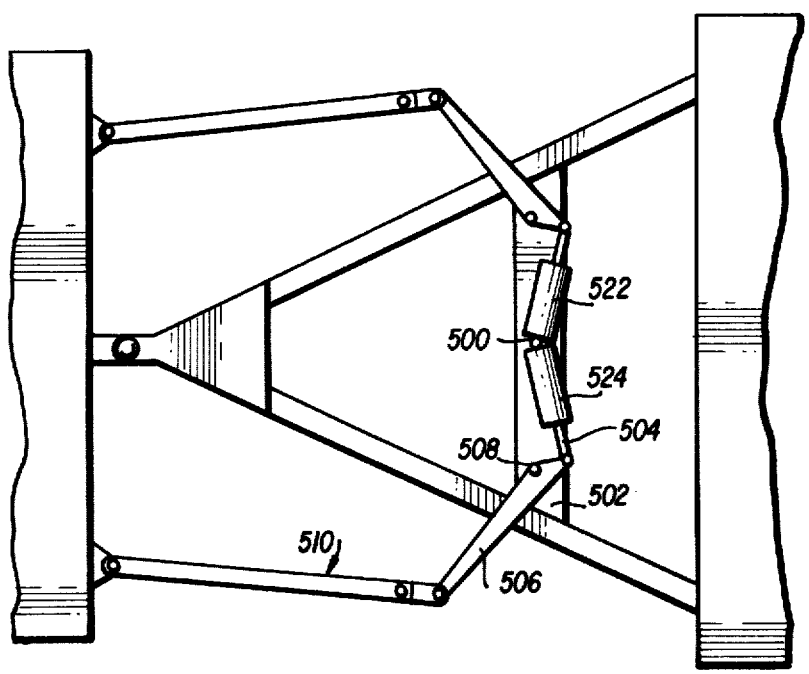
FIGS. 13A and 13B are plan views of the towing connection illustrating a modification in the linkages connecting the hydraulic units of the invention between the two vehicles, the linkages being shown in the straight-ahead and right turn positions, respectively.

A number of alternatuve coupling arrangements are possible for solving the problems presented by the large distances through which the coupling linkages must travel as the vehicles negotiate short radius turns at low speeds. Two such variations of the linkages between the hydraulic units and the vehicles are illustrated in FIGS. 13A and 14A. In all of these embodiments, the hydraulic resistance and brake control functions are the same as those previously described. A particularly important feature of these linkages, as with those already described, is that they are capable of strongly resisting compression while providing little resistance to extension.

Figure 13B:
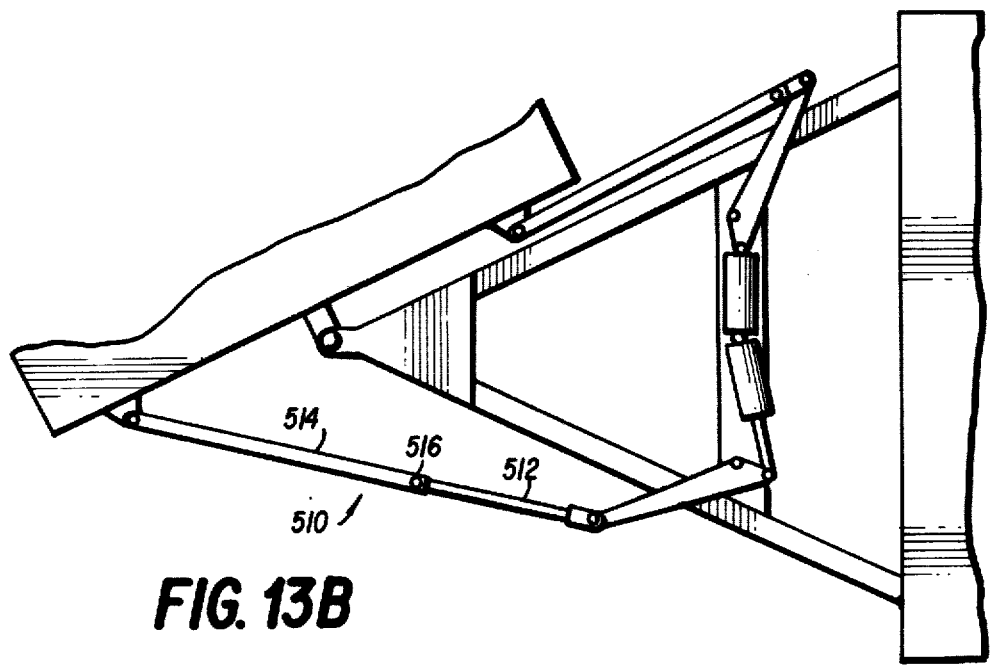

In FIG. 13A, both hydraulic cylinders are pivotally connected at 500 to a transverse strut 502 extending between the frame members of the tow bar. Each hydraulic unit has a nonextensible piston rod 504 connected to one end of a pivotal lever 506 fulcrumed at 508 and connected at its opposite end to a telescopic shaft 510 having a rod 512 telescopically received within a tube 514 as seen in FIG. 13B. During turns of less than 10 degrees, the rod 512 is held within tube 514 by a detent connection 516 which functions in the same manner as the detent connection 314 of FIG. 9. Each of the hydraulic units employ the internal components previously described. The hydraulic units are in their neutral, straight-ahead position in FIG. 13A and in the position accommodating a maximum right turning angle in FIG. 13B. As further modification, the hydraulic cylinders 522 and 524 could be replaced by a single cylinder with a piston at each end defining a common pressure chamber therebetween with a single, centrally located pressure port. In this modification, the fulcrum 508 would be relocated to a position where the pistons reciprocate along a common axis.

Figure 14B:
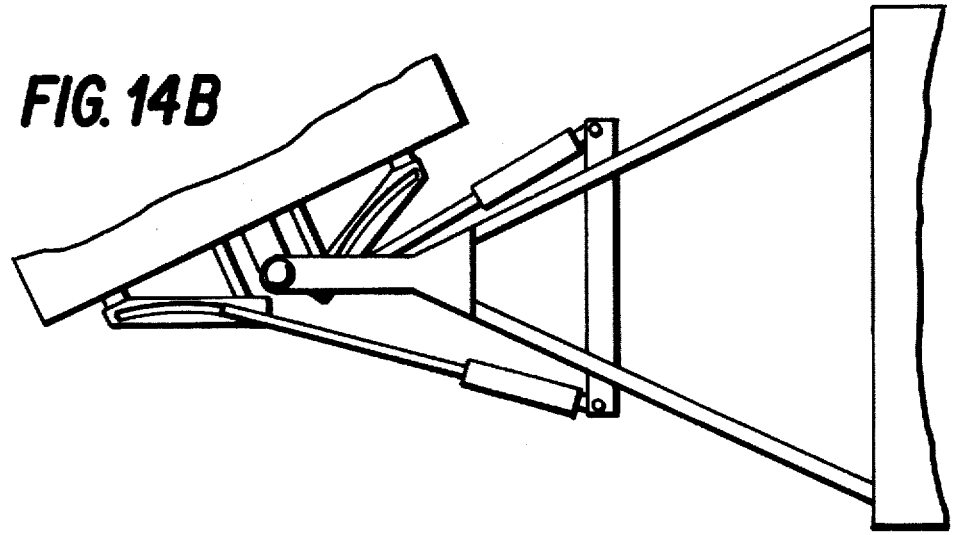

FIGS. 14A and 14B illustrate an embodiment of the invention that does not require a connecting shaft with telescoping action. In this embodiment, a solid piston rod 540 is attached to the towing vehicle frame by a coupling 542 which travels in a slot 544 of a track member 546. At turning angles of less than 10 degrees, the coupling 542 remains at the outer end of slot 544, being held in that position by the slack removal biasing forces of the hydraulic units. When held in this position, the piston rod 540 transmits the stabilizing forces provided by the hydraulic units while in their high speed mode. With reference to FIG. 14A, the rear end of each hydraulic cylinder is pivotally connected at 550 to the laterally projecting ends of a transverse strut 552. In the high speed mode, the cylinder connection 550 pivots about coupling connection 542 at a radius of R1. On the other hand, the arc of curved slot 544 has a radius R2 from a geometric center "C". The center "C" is outside of the axis of pivot connection 550 by a distance that determines the relative turning angle required to release coupling 542 from the outer end of the slot. Release occurs when pivot connection 550 goes over center "C" as the inboard hydraulic unit is compressed. In the preferred embodiment, release of the inboard coupling occurs at a turning angle of approximately 20 degrees and upon its release, the hydraulic units offer no further resistance to turning movement. In order for center "C" to be outside of connection 550, R1 must be greater than the distance "D" between connection 550 and the inner end of slot 544. The radius R2 should also be chosen so as to give a relatively flat arc to the curved slot in order to avoid overly rapid movement of the inboard coupling after the hydraulic unit has passed over center.

FIG. 14B illustrates the configuration assumed by the linkages of FIG. 14A as the vehicles execute a sharp right turn. As evident from this figure, the hydraulic units and associated linkages are positioned below the towing connection so that the latter swings over the inboard track. To also accommodate the turn, the outboard coupling travels inwardly along the slot which thus serves as an extension of piston shaft 540. The inward travel of the outboard coupling commences before the inboard coupling is released from the outer end of its slot, preferably at a turning angle of about 10 to 12 degrees.

The foregoing specific embodiments are merely exemplary of the various embodiments and modifications possible and the true scope of the invention is not to be limited to those specific embodiments but is defined by the claims at the end of this specification. Numerous other embodiments and modifications of the various mechanism and apparatus of the invention will be apparent to those skilled in the art from consideration of the disclosure as a whole. In addition, a number of component functions may be varied or changed without departing from the scope of the invention. For example, the transition of the fluid system from the low speed to the high speed mode may be affected by parameters other than vehicle speed. When the fluid system is in the low speed-low pressure mode, unstable oscillations produce a higher rate of piston movement than do normal vehicle movements. The higher rate of piston movement in response to the onset of unstable oscillations could be sensed by an electrical pickup responsive directly to that rate or indirectly through system pressure. A rate signal could then be generated to actuate the solenoid valve and place the fluid system in its stiff mode. As yet another alternative, the pressurized fluid generated by the present invention could be used to actuate the resilient expandable member of a frictional type stabilizer, such as that disclosed in the cited patent to Knox. An alternative for brake actuation would be the use of a single on-off pressure switch of the type disclosed in the cited Reise patent to activate the electric trailer brakes. Similarly, the braking force could be applied only by the brakes on the inboard side of the trailer as determined by the direction of the towed vehicle sway.

It is also possible to make many changes in the sizes and relative dimensions of various components and to employ various liquids, gases and other fluids in place of the hydraulic fluid described. Similarly, the fluid pressure levels for brake actuation may vary considerably since they are a function of the moment arm of resistive forces about the yaw axis and other geometric parameters of the specific stabilizer assembly employed.

It should be recognized that the resistance to relative turning movement provided by the invention increases with the rate of that movement. This is because the resistance to fluid flow developed by the orifices and other flow restrictions causes cylinder pressure to increase with piston velocity. The level of pressure and turning resistance produced in response to a given turning rate depends upon the nature and resistance characteristics of the flow restriction which may take many forms. For example, line resistance alone may be used for the low speed mode instead of a low speed orifice. Alternately, three or more orifices may be used with appropriate solenoid valves to vary the orifice combinations available in the flow path in accordance with many different speed ranges. The flow restrictions may similarly be varied in response to the rate of turn which can be sensed electrically and used as a basis for selecting a predetermined combination of orifices.

The foregoing alternatives and all alterations that can be made by persons skilled in the art are within the scope and contemplation of this invention.

INDUSTRIAL APPLICABILITY

It should be readily apparent from the above discussion that the present invention is capable of generating a large range of viscous resistances for dampening trailer sway. The resistances are produced by compressing hydraulic fluid and forcing it to flow at different flow rates depending upon vehicle speed. A low speed flow restriction allows large angular displacements without generating high resistance but still providing "soft" stabilizing forces. At speeds above 37 miles per hour, the flow restriction is increased so that small angular displacements provide the large resistances required to prevent high speed trailer sway. In its high speed mode, the stabilizing device actually provides a dynamic stability for the vehicle combination that may be greater than either vehicle experiences separately. In the higher speed range, the stabilized combination behaves like a single long vehicle with a rigid frame instead of two vehicles hinged at the middle. The hydraulic system thus functions full time as an extremely effective stabilizer.

Fluid system pressure also affords a positive and accurate method of sensing a potentially out-of-control situation. This pressure is used to activate the towed vehicle brakes through an emergency brake control system. The brake control system will find utility with numerous different types of electric and hydraulic brake systems of towed vehicles. Towed vehicle brakes are actuated only when vehicle speed exceeds 30 miles per hour and a hazardous condition is detected by the hydraulic stabilizers, and then only in the amount necessary to bring trailer sway under control. Should a situation demand larger retarding forces from the towed vehicle brakes, such as in negotiating an unexpected turn in the roadway or avoiding an obstacle at high speeds, the device accurately senses the condition and applies heavy braking to rapidly slow down both the towed and towing vehicles to a speed where sway oscillations are susceptible to control by hydraulic dampening alone. Under emergency conditions, the application of towed vehicle brakes at the proper time and in the proper sequence is of primary importance in avoiding a serious mishap. The added feature of applying trailer brakes only when necessary provides a combined system which is the most practical and effective stabilizing unit known to be available for controlled towing at all times, even where towed to towing vehicle weight ratios exceed 1.0.

The novel stabilizer further includes a slack removal mechanism producing zero slack in the linkages that must sense and respond to trailer sway. This zero slack arrangement provides the high sensitivity required for immediately sensing and opposing high speed sway conditions before they can generate sufficient forces to cause vehicle upset.

The invention has industrial applicability in a variety of forms as specifically described in the detailed description of its best modes and shown in the accompanying drawings. It may be embodied readily in many other specific forms without departing from the spirit and essential characteristics of the invention. All of the present embodiments are therefore to be considered as illustrative and not restrictive, the true scope of the invention being defined by the following claims. All changes and variations coming within the meaning and range of equivalence of the claims are intended to be embraced in the language employed therein.

I claim:

1. Apparatus for stabilizing a towed vehicle joined to a towing vehicle by a towing connection permitting said vehicles to turn relative to each other about a yaw axis, said apparatus comprising:
   turning resistance means for at times providing a resistance to said relative turning movement between said towed and towing vehicles about said yaw axis;
   coupling means for mechanically transmitting the turning resistance provided by said turning resistance means to said towed and towing vehicles;
   and extensible means for biasing said towed vehicle away from said towing vehicle such that tension is placed on said towing connection and substantially all slack is removed from said towing connection and from said coupling means whereby even slight relative turning movement between said towed and towing vehicles about said yaw axis is resisted by said turning resistance means.

2. The apparatus of claim 1 in which said extensible means includes a piston, a cylinder cooperating with said piston to define a pressure chamber, fluid means for pressurizing said pressure chamber so as to provide an extensible bias between said piston and said cylinder, and means for transmitting said extensible bias to said coupling means such that said coupling means is placed in compression.

3. The apparatus of claim 1 in which said apparatus further includes resistance control means for controlling the resistance to turning provided by said turning resistance means.

4. The apparatus of claim 3 in which said resistance control means includes speed responsive means for providing said control in response to the speed of the joined vehicles.

5. The apparatus of claim 3 in which said resistance control means includes rate responsive means for providing said control in response to the rate of said relative turning movement.

6. The apparatus of claim 1 having a towing connection permitting relative pitching movement between said towing and towed vehicles about a pitch axis, and in which said coupling means is connected respectively to said towed and towing vehicles so that said turning resistance means opposes said relative pitching movement.

7. The apparatus of claim 1 for stabilizing a towed vehicle having brakes, said apparatus further comprising brake actuating means for actuating brakes to retard towed vehicle motion and brake control means for selectively controlling the actuation of said brakes by said brake actuating means.

8. Apparatus for stabilizing a towed vehicle joined to a towing vehicle by a towing connection permitting said vehicles to turn relative to each other about a yaw axis, said towed vehicle having brakes for retarding towed vehicle motion, said apparatus comprising:

turn sensing means for at times providing a signal responsive to relative turning movement between said towed and towing vehicles about said yaw axis;

coupling means for mechanically transmitting said relative turning movement to said turn sensing means;

brake actuator means for actuating said brakes to retard towed vehicle motion in response to said signal;

and extensible means for biasing said towed vehicle away from said towing vehicle such that tension is placed on said towing connection and substantially all slack is removed from said towing connection and from said coupling means such that even slight relative turning movement between said towed and towing vehicles about said yaw axis causes actuation of said brakes by said brake actuator means.

9. The apparatus of claim 8 in which said brake actuator means includes brake control means for controllably varying the retardation to towed vehicle motion provided by said brakes.

10. The apparatus of claim 9 in which said brake control means includes speed responsive means for providing said control in response to the speed of the joined vehicles.

11. The apparatus of claim 9 in which said brake control means includes rate responsive means for providing said control in response to the rate of said relative turning movement.

12. The apparatus of claim 8 in which said extensible means includes a piston, a cylinder cooperating with said piston to define a pressure chamber, fluid means for pressurizing said pressure chamber so as to provide an extensible bias between said piston and said cylinder, and means for transmitting said extensible bias to said coupling means such that said coupling means is placed in compression.

13. Apparatus for stabilizing a towed vehicle joined to a towing vehicle by a towing connection permitting said vehicles to turn relative to each other about a yaw axis, said towed vehicle having brakes for retarding towed vehicle motion, said apparatus comprising:

turning resistance means for at times resisting said relative turning movement between said towed and towing vehicles about said yaw axis; and turn control means for jointly controlling both the resistance to turning provided by said turning resistance means and the retardation to towed vehicle motion provided by said brakes, said turn control means including speed responsive means for providing said joint control in response to the speed of the joined vehicles.

14. The apparatus of claim 13 in which said turn control means includes brake control means for controllably varying the retardation to towed vehicle motion provided by said brakes.

15. The apparatus of claim 14 in which said brake control means includes rate responsive means for varying the retardation of towed vehicle motion provided by said brakes in accordance with the rate of said relative turning movement.

16. The apparatus of claim 13 in which said turn control means includes resistance control means for controllably varying the resistance to turning provided by said turning resistance means.

17. The apparatus of claim 16 in which said resistance control means includes rate responsive means for varying said turning resistance in accordance with the rate of said relative turning movement.

18. The apparatus of claim 13 in which said turn control means includes rate responsive means for providing said joint control in response to the rate of said relative turning movement.

19. A stabilizing apparatus for controlling the brakes of a towed vehicle joined to a towing vehicle by a towing connection permitting turning movement of said towed vehicle relative to said towing vehicle about a yaw axis, said apparatus comprising:

signal generating means connected between said towed and towing vehicles for providing a signal having at least one characteristic responsive to the rate of a change of angle caused by a single relative turning movement between said towed and towing vehicles about said yaw axis; and, actuator means for actuating said brakes in response to said at least one signal characteristic, said actuator means being effective to vary the magnitude of retardation to towed vehicle motion provided by said brakes in response to the magnitude of said rate of angle change caused by a single relative turning movement between said vehicles in either direction about said yaw axis.

20. The stabilizing apparatus of claim 19 in which said signal generating means includes cylinder means, piston means cooperating with said cylinder means to form a chamber for pressurizing a fluid, and coupling means for causing said piston to pressurize a fluid in said chamber as said towed and towing vehicles turn relative to each other about said yaw axis; and in which said towed vehicle brakes are operated by an electrical current and said brake actuator means includes circuit means for transmitting an electrical current to said brakes, resistance means for varying said current, and pressure responsive means for causing said resistance means to vary said electrical current in response to the pressure of fluid in said chamber.

21. Apparatus for stabilizing a towed vehicle joined to a towing vehicle by a towing connection permitting said vehicles to turn relative to each other about a yaw axis, said towed vehicle having brakes for retarding towed vehicle motion, said apparatus comprising:

turn sensing means for at times providing a signal responsive to relative turning movement between said towed and towing vehicles about said yaw axis;

coupling means for mechanically transmitting said relative turning movement to said turn sensing means;

brake actuator means for actuating said brakes to retard towed vehicle motion in response to said signal;

and control means for controllably varying the retardation to towed vehicle motion provided by said brakes in response to the speed of the joined vehicles.

22. Apparatus for stabilizing a towed vehicle having brakes and joined to a towing vehicle by a towing connection permitting said vehicles to turn relative to each other about a yaw axis, said apparatus comprising:

turning resistance means for providing a controllably variable resistance to said turning movement of said towed and towing vehicles relative to each other about said yaw axis;

brake actuator means for actuating said brakes to provide controllably variable retardation of towed vehicle motion; and, control means for varying both the resistance to turning provided by said turning resistance means and the retardation to towed vehicle motion provided by said brake actuator means in response to the rate of said relative turning movement.

23. The apparatus of claim 22 in which said apparatus further includes speed responsive means for varying both the resistance to turning provided by said turning resistance means and the retardation to towed vehicle motion provided by said brake actuator means in accordance with the speed of the joined vehicles.

24. The apparatus of claim 22 in which said brake actuator means includes test means for actuating said brakes to simulate a predetermined rate of said relative turning movement in the absence of any actual significant rate of said relative turning movement.

25. The apparatus of claim 22 in which said control means includes brake control means for controllably varying the retardation to towed vehicle motion provided by said brakes in accordance with the magnitude of the resistance to said relative turning movement provided by said turning resistance means.

26. The apparatus of claim 22 in which said control means includes speed responsive means for selectively controlling actuation of said brakes in accordance with the speed of the joined vehicles.

27. The apparatus of claim 22 in which said control means includes speed responsive means for varying the retardation of towed vehicle motion provided by said brakes in accordance with the speed of the joined vehicles.

28. The apparatus of claim 22 in which said control means includes speed responsive means for selectively controlling actuation of said turning resistance means in accordance with the speed of the joined vehicles.

29. The apparatus of claim 22 in which said control means includes speed responsive means for varying said turning resistance in accordance with the speed of the joined vehicles.

30. The apparatus of claim 22 in which said control means includes signal generating means for providing a signal having at least one characteristic responsive to the rate of said relative turning movement.

31. The apparatus of claim 22 in which said control means includes a first member, a second member movable relative to said first member, and coupling means connected between said towed and towing vehicles for causing said second member to move relative to said first member as said towed and towing vehicles turn relative to each other about said yaw axis.

32. The apparatus of claim 31 in which said coupling means includes at least one mechanical linkage for causing said relative movement between said first and second members, and in which said apparatus further includes biasing means for removing substantially all mechanical slack from said mechanical linkage such that even slight relative turning movement between said towed and towing vehicles about said yaw axis causes said relative movement between first and second members.

33. The apparatus of claim 32 in which said biasing means includes spring means for biasing said first and second members relative to each other such that a slack removing biasing force is exerted on said mechanical linkage.

34. The apparatus of claim 31 in which one of said first and second members is a cylinder and the other of said first and second members is a piston slidable in said cylinder, and said coupling means causes said piston to slide in said cylinder as said towed and towing vehicles turn relative to each other about said yaw axis.

35. The apparatus of claim 34 in which said piston and said cylinder cooperate to define a chamber for containing a pressurized fluid.

36. The apparatus of claim 35 in which said control means further includes pressure responsive means for selectively controlling both the turning resistance provided by said turning resistance means and the retardation of towed vehicle motion provided by said brakes in accordance with the pressure of a fluid in said chamber.

37. The apparatus of claim 35 in which said coupling means includes at least one mechanical linkage for causing said relative movement between said piston and said cylinder, and said apparatus further includes biasing means for removing substantially all mechanical slack from said at least one mechanical linkage such that even slight relative turning movement between said towed and towing vehicles about said yaw axis causes said relative movement between said piston and said cylinder.

38. The apparatus of claim 37 in which said biasing means includes spring means for biasing said piston and said cylinder relative to each other such that a slack removing biasing force is exerted on said mechanical linkage.

39. The apparatus of claim 38 in which said biasing means further includes compressing means for causing said spring means to provide a predetermined slack removing biasing force on said mechanical linkage in response to relative turning movement between said towed and towing vehicles.

40. The apparatus of claim 39 in which at least a portion of said spring means is carried within said chamber and said compressing means is comprised of said piston.

41. The apparatus of claim 37 in which said biasing means includes pressurizing means for pressurizing a fluid in said chamber and in which the cooperation between said piston and said cylinder is such that said pressurized fluid causes a slack removing biasing force to be exerted on said at least one mechanical linkage.

42. The apparatus of claim 41 in which said pressurizing means includes pump means for supplying fluid to said chamber.

43. The apparatus of claim 41 in which said pressurizing means includes accumulator means for maintaining a predetermined static pressure on fluid in said chamber.

44. The apparatus of claim 43 in which said pressurizing means further includes pump means for supplying fluid under pressure to said accumulator means, said pump means being arranged for actuation by said relative turning movement between said towed and towing vehicles.

45. The apparatus of claim 44 in which said pump means is comprised of said piston and said cylinder.

46. The apparatus of claim 35 in which said control means further includes conduit means for permitting fluid flow in and out of said chamber.

47. The apparatus of claim 46 in which said conduit means includes at least one fluid passage for permitting the flow of fluid between respective sides of said piston.

48. The apparatus of claim 47 in which said at least one fluid passage is in said piston.

49. The apparatus of claim 41 in which said conduit means includes an orifice for controlling the rate of fluid flow out of said chamber.

50. The apparatus of claim 46 in which said means further includes flow control means for controlling the flow of fluid through said conduit means.

51. The apparatus of claim 50 in which said flow control means includes a check valve.

52. The apparatus of claim 50 in which said conduit means includes first and second fluid passages permitting flow out of said chamber at respectively different rates of flow, and in which said flow control means comprises valve means for selectively controlling the flow of said fluid through said fluid passages.

53. The apparatus of claim 50 in which said flow control means includes adjustable valve means for varying the rate of fluid flow through said conduit means.

54. The apparatus of claim 53 in which said conduit means includes a first fluid passage containing an orifice for providing a restricted flow rate of said fluid out of said chamber independent of said valve means, and a second fluid passage containing said adjustable valve means, said second passage providing for fluid flow out of said chamber at a rate substantially greater than said first passage.

55. The apparatus of claim 54 in which said adjustable valve means is adjustable between a fully open position permitting free flow of fluid through said second passage and a fully closed position preventing flow of fluid through said second passage.

56. The apparatus of claim 53 in which said apparatus further includes speed responsive means for selectively adjusting said valve means in accordance with the speed of the joined vehicles.

57. The apparatus of claim 56 in which said speed responsive means includes electrical operating means for selectively adjusting said adjustable valve means and electrical control means for controlling said electrical operating means in accordance with the speed of said joined vehicles.

58. The apparatus of claim 46 in which said conduit means includes a fluid reservoir and at least one passage for conveying a fluid between said chamber and said reservoir.

59. The apparatus of claim 58 in which said apparatus further includes pressurizing means for pressurizing a fluid in said reservoir so as to maintain a minimum predetermined pressure within said chamber.

60. The apparatus of claim 58 in which said cylinder defines at least a portion of said reservoir.

61. The apparatus of claim 58 in which said at least one fluid passage contains a check valve for permitting fluid flow from said reservoir to said chamber when said piston slides in one direction while preventing fluid flow from said chamber to said reservoir when said piston slides in the other direction.

62. The apparatus of claim 61 in which said conduit means includes a second fluid passage containing an orifice for providing restricted fluid flow from said chamber to said reservoir when said piston slides in said other direction.

63. The apparatus of claim 62 in which said conduit means includes a third fluid passage containing adjustable valve means for varying the rate of fluid flow from said chamber to said reservoir when said piston slides in said other direction.

64. The apparatus of claim 22 in which said control means includes a reference means, a first movable means, a second movable means, and coupling means for causing said first movable means to move relative to said reference means as said towed and towing vehicles turn relative to each other in one direction about said yaw axis and said second moveable means to move relative to said reference means as said towed and towing vehicles turn relative to each other in the other direction about said yaw axis.

65. The apparatus of claim 64 in which said control means is responsive to the rate of said relative movements between said first and second movable means and said reference means and causes the turning resistance provided by said turning resistance means and the retardation of towed vehicle motion provided by said brakes to vary in accordance with the rate of said relative movements.

66. The apparatus of claim 64 in which said reference means comprises a cylinder means, said first movable means includes a first piston means movable relative to said cylinder means, and said second movable means includes a second piston means movable relative to said cylinder means.

67. The apparatus of claim 66 in which said first piston means and said cylinder means define a first chamber for containing a pressurized fluid and said second piston means and said cylinder means define a second chamber for containing a pressurized fluid.

68. The apparatus of claim 22 for a towed vehicle having electrically operated brakes, in which said control means includes brake control means for providing an electrical signal to operate said electrical brakes.

69. The apparatus of claim 68 in which said brake control means includes signal generating means for providing said electrical signal in response to said relative turning movement and circuit means for transmitting said signal to said electrical brakes.

70. The apparatus of claim 69 in which said brake control means further includes switch means for selectively controlling the transmission of said signal to said brakes by said circuit means.

71. The apparatus of claim 70 in which said brake control means further includes speed responsive means for causing said switch means to selectively control the transmission of said signal to said brakes in accordance with the speed of said joined vehicles.

72. The apparatus of claim 70 in which said brake control means further includes rate responsive means for causing said switch means to selectively control transmission of said signal to said brakes in accordance with the rate of said relative turning movement.

73. The apparatus of claim 69 for a towed vehicle having electric brakes operable to vary retardation of towed vehicle motion in accordance with variations in at least one characteristic of said electrical signal, in which said signal generating means includes signal control means for varying said at least one electrical signal characteristic.

74. The apparatus of claim 73 in which said variable signal characteristic is electrical current and said signal control means includes current resistance means for controllably varying said current.

75. The apparatus of claim 74 in which said current resistance means includes a first current resistance and said signal control means further includes switch means for causing said circuit means to transmit said electrical current to said brakes through said first current resistance at a first predetermined rate of said relative turning movement.

76. The apparatus of claim 75 in which said current resistance means includes a second current resistance and said switch means causes said circuit means to transmit said electrical current to said brakes through said second current resistance at a second predetermined rate of said relative turning movement.

77. The apparatus of claim 74 in which said current resistance means includes a variable current resistance for controllably varying said current and said signal control means further includes means for causing said variable current resistance to vary said current in accordance with the rate of said relative turning movement.

78. The apparatus of claim 69 in which said signal generating means includes cylinder means, piston means cooperating with said cylinder means to form a chamber for pressurizing a fluid, and coupling means for causing said piston to pressurize a fluid in said chamber as said towed and towing vehicles turn relative to each other about said yaw axis.

79. The apparatus of claim 78 in which said circuit means is capable of transmitting electrical current to said brakes and includes current resistance means for varying said current, and in which said signal generating means further includes pressure responsive means for causing said current resistance means to vary said current in accordance with the pressure of fluid in said chamber.

80. The apparatus in claim 79 in which said brake control means further includes switch means for selectively controlling the transmission of said current through said current resistance means in response to the pressure of fluid in said chamber.

81. The apparatus of claim 79 in which said brake control means further includes switch means for selectively controlling the transmission of said current through said current resistance means in response to the speed of said joined vehicles.

* * * * *